US006965604B1

(12) United States Patent
Sato et al.

(10) Patent No.: US 6,965,604 B1
(45) Date of Patent: Nov. 15, 2005

(54) METHOD AND APPARATUS FOR INFORMATION TRANSMISSION

(75) Inventors: Junichi Sato, Nara (JP); Takao Yamaguchi, Kyoto (JP); Tomoaki Itoh, Osaka (JP); Hiroshi Arakawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 869 days.

(21) Appl. No.: 09/869,664

(22) PCT Filed: Oct. 27, 2000

(86) PCT No.: PCT/JP00/07609

§ 371 (c)(1),
(2), (4) Date: Jun. 28, 2001

(87) PCT Pub. No.: WO01/33784

PCT Pub. Date: May 10, 2001

(30) Foreign Application Priority Data

| Nov. 1, 1999 | (JP) | ................................. 11-310552 |
| Apr. 18, 2000 | (JP) | ........................... 2000-116061 |
| May 15, 2000 | (JP) | ........................... 2000-141497 |
| Sep. 11, 2000 | (JP) | ........................... 2000-274617 |

(51) Int. Cl.[7] ......................................... H04L 12/28
(52) U.S. Cl. ..................................... 370/401; 370/338
(58) Field of Search .............................. 370/328, 335, 370/338, 401

(56) References Cited

U.S. PATENT DOCUMENTS

| 5,367,523 | A | * | 11/1994 | Chang et al. ............... 370/235 |
| 5,784,358 | A | | 7/1998 | Smith et al. |
| 5,915,207 | A | * | 6/1999 | Dao et al. ...................... 455/9 |
| 5,991,306 | A | * | 11/1999 | Burns et al. ................. 370/429 |
| 6,141,333 | A | * | 10/2000 | Chavez, Jr. .................. 370/338 |
| 6,222,856 | B1 | * | 4/2001 | Krishnan et al. ........... 370/468 |
| 6,519,241 | B1 | * | 2/2003 | Theimer ..................... 370/338 |
| 6,697,850 | B1 | * | 2/2004 | Saunders .................... 709/219 |
| 6,816,458 | B1 | * | 11/2004 | Kroon ........................ 370/235 |

FOREIGN PATENT DOCUMENTS

| EP | 895374 | 3/1998 |
| EP | 1021015 | 12/1999 |
| JP | 06069921 | 3/1994 |
| JP | 6-301887 | 10/1994 |
| JP | 07066807 | 3/1995 |
| JP | 7-248980 | 9/1995 |
| JP | 10-49422 | 2/1998 |
| JP | 10-133839 | 5/1998 |
| JP | 10-164533 | 6/1998 |
| JP | 10-257455 | 9/1998 |
| JP | 10-285460 | 10/1998 |
| JP | 11-15714 | 1/1999 |

(Continued)

OTHER PUBLICATIONS

Matsushita Technical Journal, vol. 44, No. 5, Oct. 18, 1998, Takashi Ishida et al., 'Video Proxy Server: "Video Shower" for a Wide-Area Network', pp. 98-105.

(Continued)

*Primary Examiner*—Ricky Ngo
*Assistant Examiner*—Christine Ng
(74) *Attorney, Agent, or Firm*—Harness, Dickey & Pierce, P.L.C.

(57) ABSTRACT

An improved information transmission method is provided for use in a communication network. The information transmission method combines a bandwidth control technique with a caching technique, thereby making it possible to use allocated bandwidth in an efficient manner.

12 Claims, 44 Drawing Sheets

FOREIGN PATENT DOCUMENTS

| | | |
|---|---|---|
| JP | 11-219312 | 8/1999 |
| JP | 11234333 | 8/1999 |
| JP | 2000-293424 | 10/2000 |
| WO | 99/56438 | 11/1999 |

OTHER PUBLICATIONS

S. Floyd et al., "Link-sharing and REsource Management Models for Packet Networks", IEEE/ACM Trans. On Networking. vol. 3, No. 4, pp. 365-386, Aug. 1999.

L. Rizzo et al., "Replacement Policies for a Proxy Cache", IEEE/ACM Trans. On Networking, vol. 8, No. 2, pp. 158-170, Apr. 2000.

S. Keshav, "An Engineering Approach to Computer Networking", pp. 238-248, Addison Wesley, 1997.

S. Blake et al., "An Architecture for Differentiated Services", RFC 2475, Internet Engineering Taskforce, Dec. 1998.

R. Fielding et al., "Hypertext Transfer Protocol—HTTP/1.1", RFC 2616, Internet Engineering Taskforce, Jun. 1999.

H. Schulzrinne et al., "RTP: A Transport Protocol for Real-Time Applications", RFC 1889, Internet Engineering Taskforce, Jan. 1996.

* cited by examiner

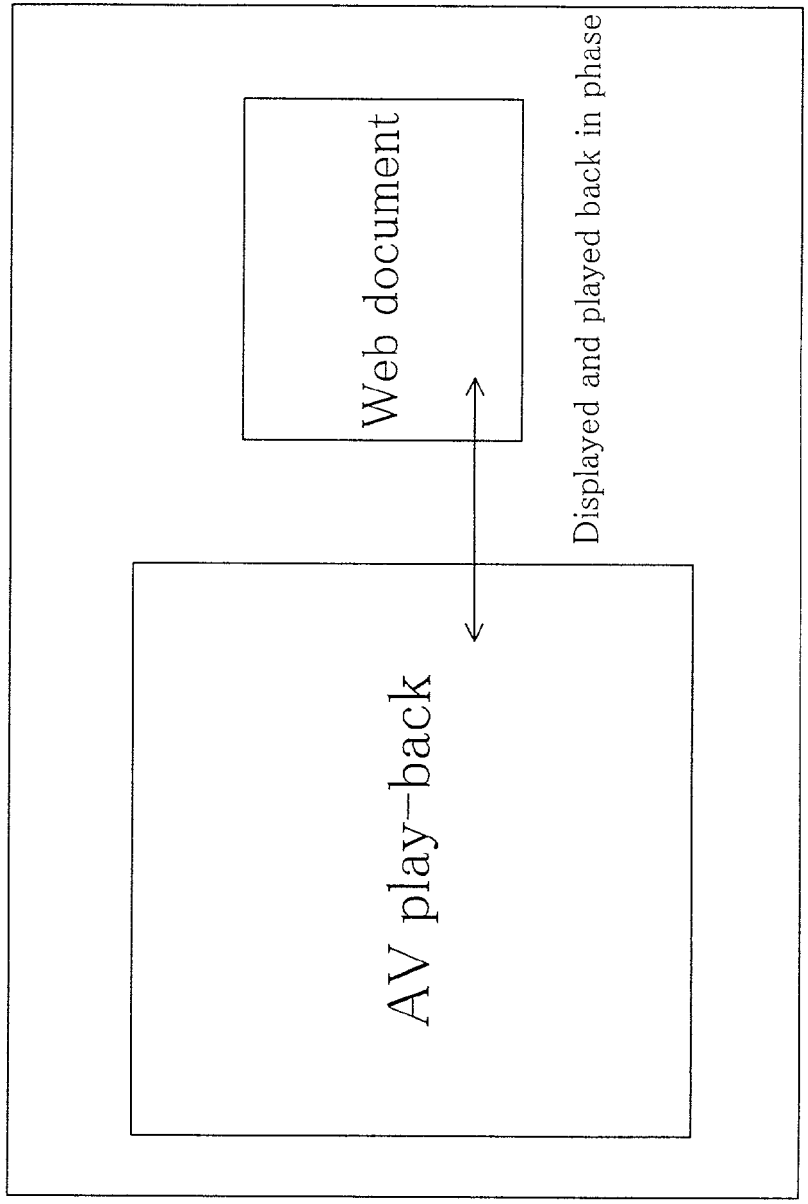

Load management rule: Most recent time of reference, Size, Effective information acquirement speed, Media type
Information freshness management rule: Most recent time of recording, number of times of reference

Fig. 26

GET/temp/test.jpg HTTP/1.1
Host:gateway
Time-Restriction:20

Fig. 28

GET/temp/test.jpg HTTP/1.1
Host:gateway
Band-Width:64k

Fig. 29

GET/temp/test.html HTTP/1.1
Host:gateway
Priority:5

GET/temp/test1.jpg HTTP/1.1
Host:gateway
Priority:3

GET/temp/test2.jpg HTTP/1.1
Host:gateway
Priority:4

GET/temp/test.html HTTP/1.1
Host:gateway
Terminal-Width:800
Terminal-Height:600
Color-Depth:16

GET/temp/test.jpg HTTP/1.1
Host:gateway
Time-Restriction:20
Time-Restriction-per-Hop:5

HTTP/1.1 200 OK
Access:254
Date:Fri,17 Sep 1999 02:14:49 GMT
Server:···

HEAD/temp/test.jpg HTTP/1.1
Host:gateway1
Time-Restriction:20

| index | Description | value |
|---|---|---|
| 00000001 | Size | Integer(byte) |
| 00000002 | Maximum total required time | Integer(second) |
| 00000003 | Required time per gate | Integer(second) |
| 00000004 | Communication rate | Integer(kilo bit/second) |
| 00000005 | : | : |

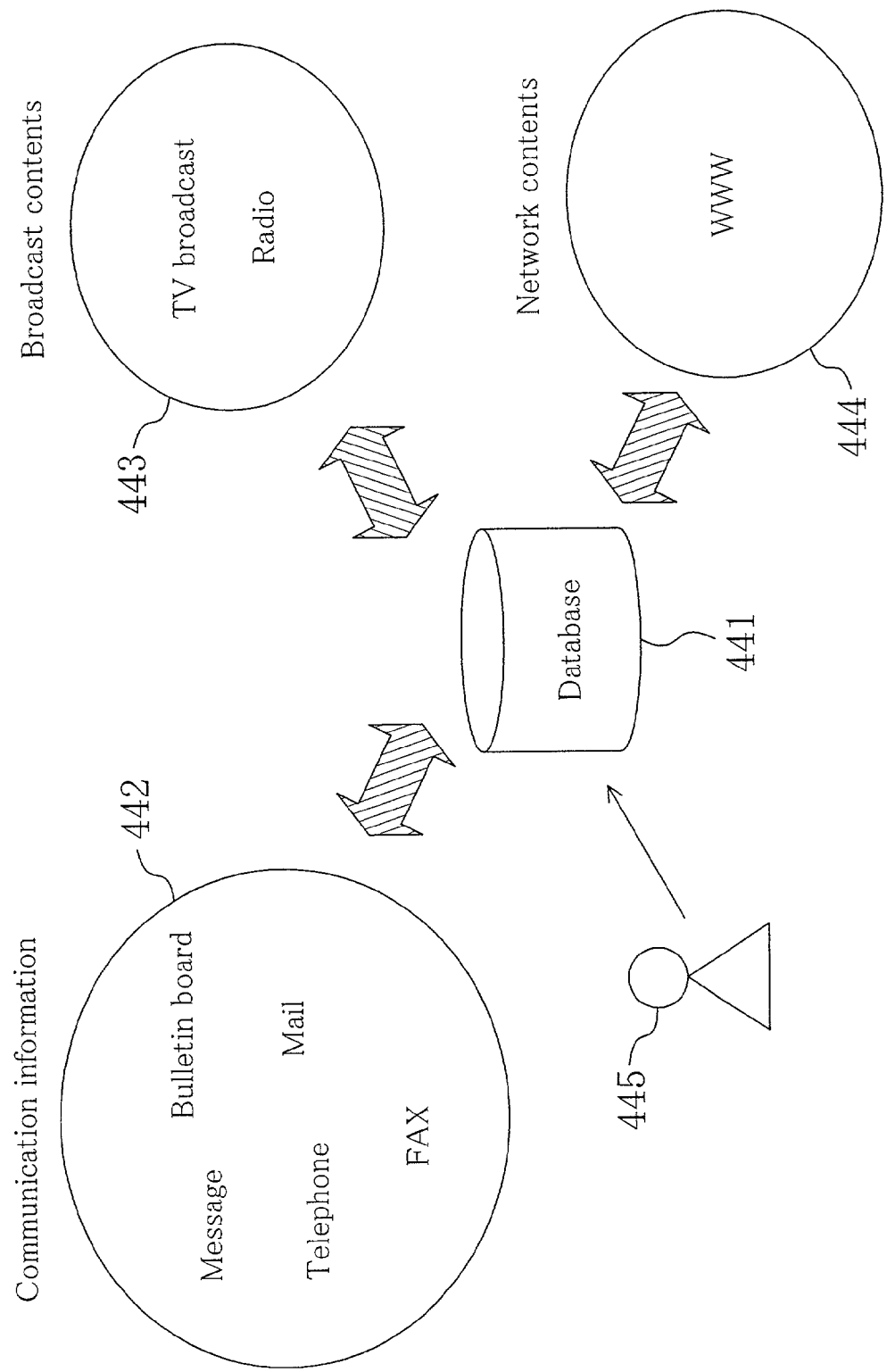

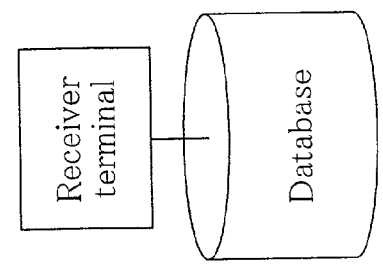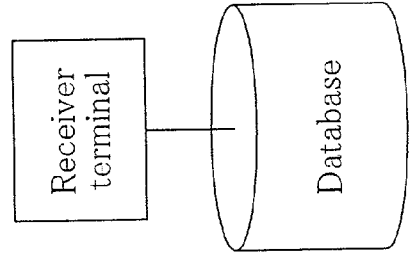
Fig. 45A
Fig. 45B

Fig. 46

Description method 1
ftp://fax.mei.co.jp/samp.doc

Description method 2
Tel 0744-98-2500
Or address
Latitude and longitude

Description method 3
Time limit=1 hour
or
Time zone=from am 0:00 to am 8:00
http://www.mei.co.jp/samp.doc Description method 4
Bandwidth=64kbps
ftp://tel.mei.co.jp/samp.doc Description method 5
Disk space>3M, filesize<1Mbyte,image=JPEG
ftp://tel.mei.co.jp/samp.doc Description method 6
CPU load<50%
ftp://tel.mei.co.jp/samp.doc Description method 7
Cost<3000YEN
ftp://fax.mei.co.jp/samp.doc Description method 8
Bandwidth=64kbps
Time=30sec.
ftp://fax.mei.co.jp/samp.doc Description method 9
Version=1.0,Priority=0
ftp://fax.mei.co.jp/samp.doc
Priority=1
ftp://fax.mei.co.jp/samp.doc Description method 10
Src Address=132.132.132.132
Src port=1000
Host name=test
ftp://fax.mei.co.jp/samp.doc Description method 11
Sensor=ON at 10:00am
Image=samp.gif

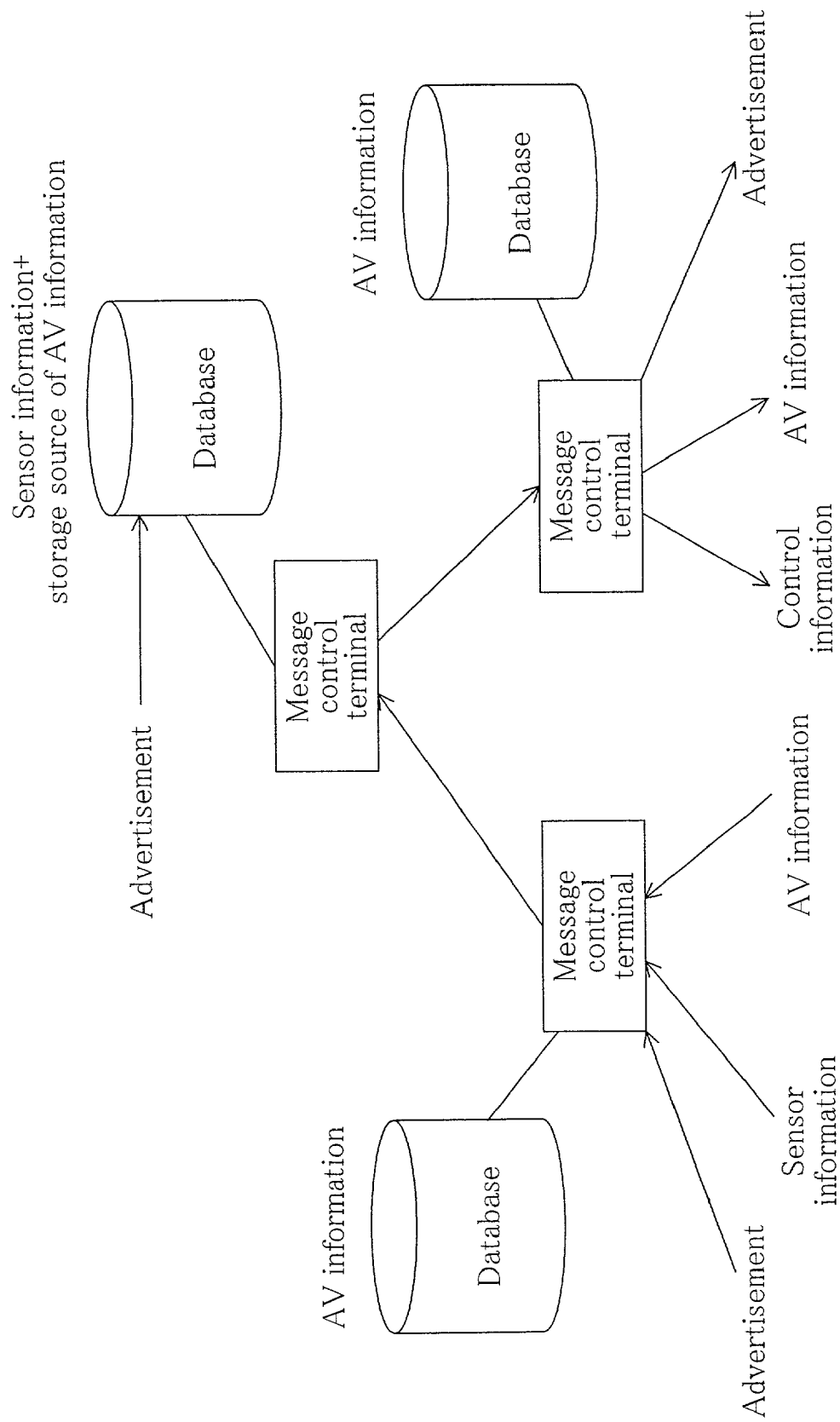

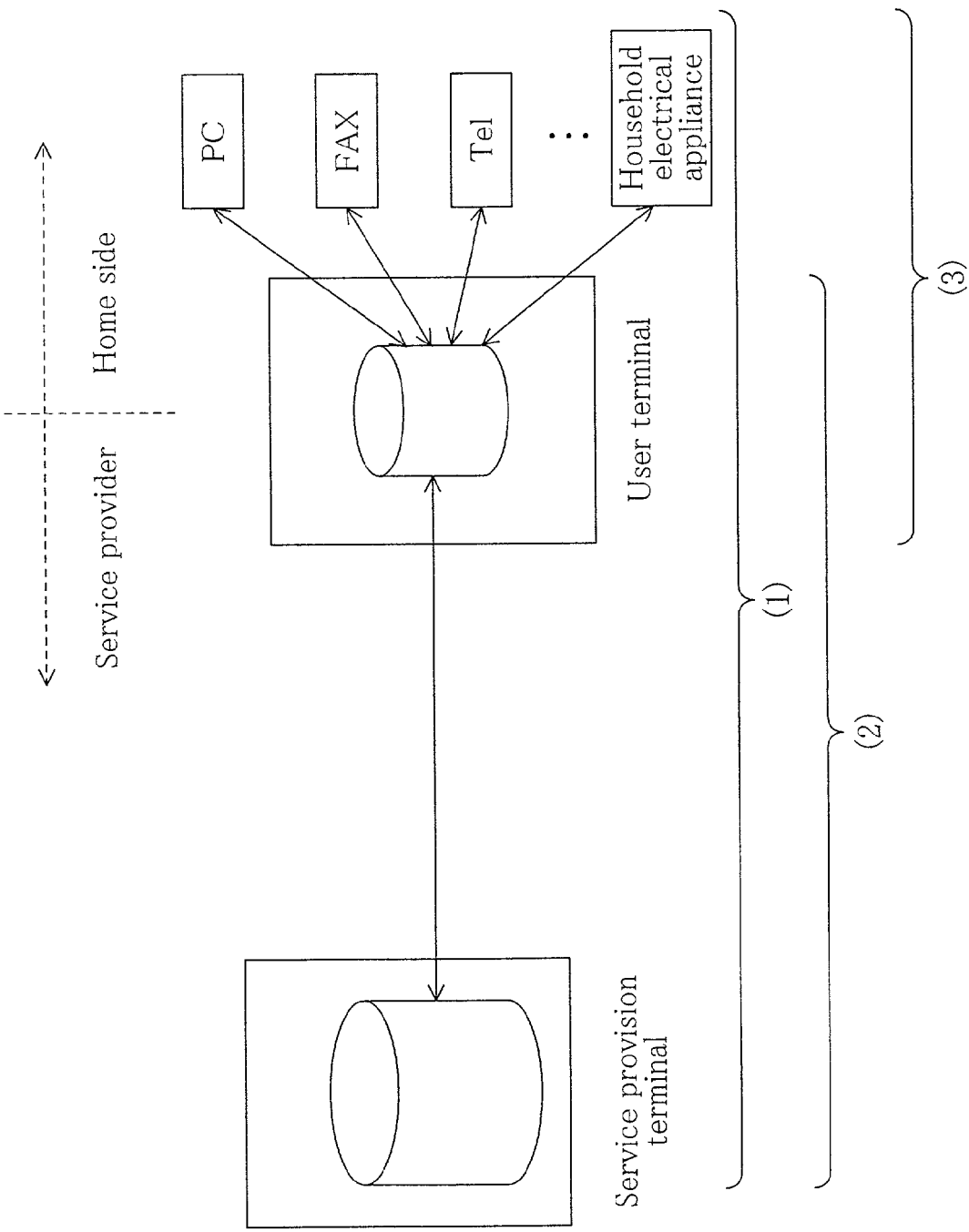

METHOD AND APPARATUS FOR INFORMATION TRANSMISSION

TECHNICAL FIELD

The present invention relates to an information transmission method which makes use of a communication network.

BACKGROUND ART

In the context of the Internet, as the techniques for transmitting audio and video streams without interruption, conventionally developed is a bandwidth control technique (e.g., S. Floyd et al., "Link-sharing and Resource Management Models for Packet Networks", IEEE/ACM Trans. on Networking, Vol. 3, No. 4, pp. 365–386, August 1995). Also developed as a technique for implementing a high-speed acquirement of Web documents is a caching technique (e.g., L. Rizzo et al., "Replacement Policies for a Proxy Cache", IEEE/ACM Trans. On Networking, Vol. 8, No. 2, pp. 158–170, April 2000.). Even with these techniques, a plurality of terminals, which share transmission bandwidth on the Internet, have encountered a problem of deterioration in transmission quality caused by the occurrence of congestion in the network.

In order to implement comfortable access to outside home by sharing a transmission bandwidth among a plurality of terminals for home use, such a technique is required of a repeater, typified by a gateway, that can make use of bandwidth in an efficient manner. Gateways interconnect transmission paths having different transmission bandwidths, thus developing a gap in transmission bandwidth. Suppose a narrower bandwidth is available to the transmission path for use outside home than to the transmission path for home use. In this case, since the bandwidth that can be used at home is restricted to a narrower transmission bandwidth, it is difficult to use an application that makes use of the transmission path of a wider bandwidth for home use.

SUMMARY OF THE INVENTION

The present invention was developed to solve the aforementioned problems. It is an object of the present invention to combine the bandwidth control technique with the caching technique in harmony, thereby making it possible to use allocated bandwidths in an efficient manner.

To solve the aforementioned problems, an information transmission method according to the present invention comprises the step of monitoring a transmission bandwidth for transmitting data to and receiving data from a transmitter terminal and a transmission bandwidth for transmitting data to and receiving data from a receiver terminal. The method also comprises the steps of determining a procedure of requesting for data with a request from the receiver terminal for transmission being employed as input, and controlling methods for using a cache and for transferring data in accordance with bandwidth information of said transmitter and receiver terminals and said request for data.

BRIEF DESCRIPTION OF THE DRAWINGS

FIG. 3 is an explanatory view illustrating a TV broadcast in which Web documents appear operatively associated therewith;

FIG. 26 is a view illustrating an example of a description of supplementary information;

FIG. 28 is a view illustrating an example of a description of supplementary information;

FIG. 29 is a view illustrating an example of a description of supplementary information according to a fourth embodiment of the present invention;

FIG. 44 is a view illustrating a network configuration according to a twelfth embodiment of the present invention;

FIG. 45A is an explanatory view illustrating an information transmission according to an embodiment of the present invention;

FIG. 45B is an explanatory view illustrating an information transmission according to another embodiment of the present invention;

FIG. 46 is an explanatory view illustrating a method for describing the location of and conditions for acquiring information;

FIG. 50 is an explanatory view illustrating an example of using the message control terminal for composing and decomposing messages; and FIG. 51 is an explanatory view illustrating a method for updating information according to a thirteenth embodiment of the present invention.

BEST MODE FOR CARRYING OUT THE INVENTION

Now, the embodiments of the present invention will be explained below with reference to the accompanying drawings.

Embodiment 1

A system and method for transmitting information according to the first embodiment of the present invention will be explained. In the present invention, "contents" refer to multi-medium information such as video, audio, and text data. In addition, a Web document can contain multi-medium information such as moving pictures, audio, and music. Incidentally, in the present invention, the "home gateway", "gateway", "information acquirement repeater", and "repeater" express the same meaning and function, unless otherwise specified.

In the Internet, the WWW (World Wide Web) has started providing a service of transmitting streams such as moving pictures and audio in addition to conventional Web documents. In order to guarantee the quality of both Web document and stream, this requires to control their quality in accordance with their respective property. For Web documents, a proxy server is provided with a cache for preventing the same document from being accessed a plurality of times, thereby reducing the access time. In order to increase the hit rate of a plurality of accesses in the cache, studies have been made on how to select an unnecessary document to be deleted. In addition, such a software product has made its appearance that looks ahead the link contained in the page being displayed, with a cache being provided in a user terminal, to thereby shorten the access time sensed by the user. Attempts have been made to provide the proxy server with this look-ahead function. On the other hand, for streams, it is necessary to maintain their real time property. This requires control of bandwidth for preventing dropouts or delays of stream information. WFQ (weighted Fair Queuing) is employed to ensure the fairness between the stream transmitted using UDP (User Datagram Protocol) and the Web document transmitted using TCP (Transmission Control Protocol), while CBQ (Class-Based Queuing) is employed for control in accordance with transmission rates. The WFQ and CBQ are detailed in "An Engineering Approach to Computer Networking", S. Keshav, pp. 238–248, Addison Wesley, 1997, and in the aforementioned paper by S. Floyd et al., respectively. In the present invention, a method is described first which integrates the bandwidth control technique and the caching technique to thereby make use of transmission bandwidths and storage media in an efficient manner.

Figure 1A:
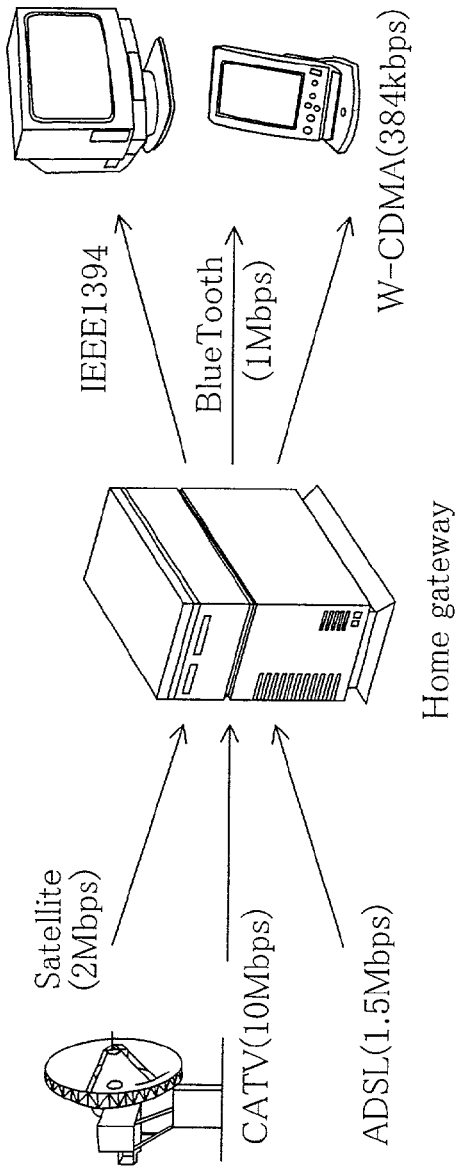
FIG. 1A is a view illustrating the configuration of a network according to a first embodiment of the present invention.
Figure 1B:
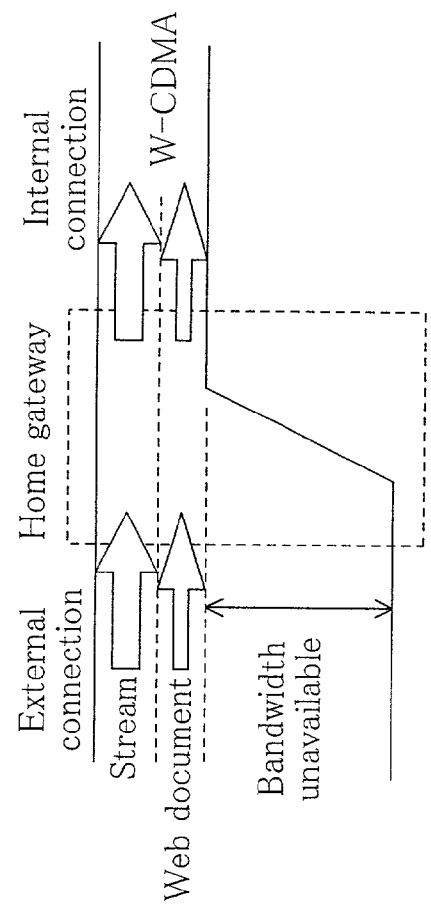
FIG. 1B is an explanatory view illustrating a bandwidth gap that occurs in the home gateway of FIG. 1A.

FIGS. 1A and 1B are explanatory views illustrating a home gateway. Suppose a plurality of terminals are connected to the Internet at home. In this case, it is necessary to provide a home gateway to share the bandwidth of an external link among the home terminals. Nowadays, an increased number of broad-bandwidth links are available such as CATV (Cable Television) or FTTH (Fiber To The Home) for external connection. FIG. 1A illustrates examples of a broadcast using a satellite (artificial satellite) and ADSL (Asymmetrical Digital Subscriber Line) in addition to CATV. On the other hand, it is predicted that wireless communications of somewhat narrower bandwidth such as BlueTooth will be increasingly employed at home. Such a case is also conceivable in which contents of the home gateway is accessed by a mobile terminal via W-CDMA (Wideband Code Division Multiple Access). In such a case, the contents of a Web document or a stream would flow through a broad-bandwidth link into a narrow-bandwidth link via the home gateway. A gap between such bandwidths would cause a bandwidth to occur which cannot be effectively used since, among other things, the communication rate of the Web document is determined by the narrower bandwidth.

Figure 2A:
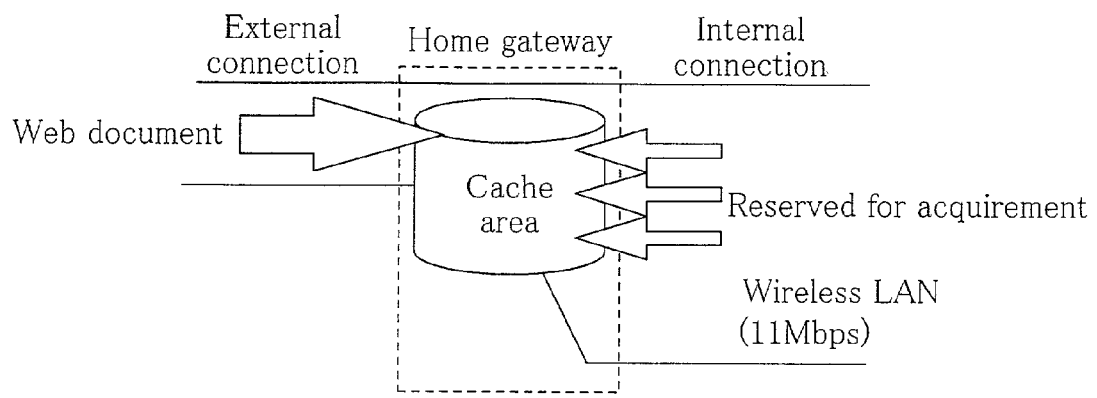
FIG. 2A is an explanatory view illustrating an information transmission method according to an embodiment of the present invention.
Figure 2B:
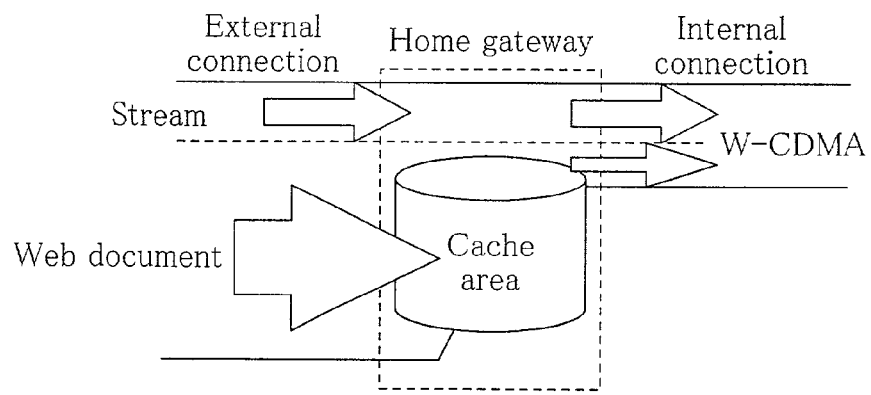
FIG. 2B is an explanatory view illustrating an information transmission method according to another embodiment of the present invention.

FIGS. 2A and 2B are explanatory views illustrating an information transmission method according to the present invention. The present invention provides a gateway with a bandwidth control function and a cache control function. For streams, the bandwidth control is carried out to protect the bandwidth of a stream. In the case of a narrow-bandwidth available for external link and a broad-bandwidth for use at home, the acquirement of contents is reserved in the gateway, which in turn acquires a Web document according to the traffic of the external link and stores the document in a cache area. Since the home user references the Web document only after it has been acquired, the user will not be bothered with the wait time for the transmission of the contents. Incidentally, for a broad-bandwidth available for use at home, it is not always necessary to protect a stream from outside home. As an example, bandwidth needs to be guaranteed for a gateway provided with a video server function that requires a broad-bandwidth for transmission. With the video server function and even with a broad-bandwidth available for use at home, a shortage in bandwidth may cause a conflict with a stream from outside home for bandwidth. Incidentally, bandwidth control is necessary for transmission from inside to outside home since a narrower bandwidth is available outside home. A videophone is an example which provides data to be transmitted to outside home and for which bandwidth control is carried out. On the other hand, suppose a conflict occurs on the input side of the home gateway for bandwidth. In this case, the size such as of a TCP window can be changed to reduce the amount of transmission of TCP, thereby making it possible to prevent a degradation in transmission quality of other transmissions (e.g., media) (FIG. 2A). On the contrary, suppose only a small amount of excess bandwidth is available for the home side provided with a narrow bandwidth. In this case, the cache control is effected to accumulate Web documents in the gateway (The documents may be looked ahead to implement a high-speed access to the Web documents or may be read in parallel to acquire information at high speeds. The order and amount of information to be acquired (parallelism of acquisition) are controlled in accordance with the inflow rate of the information, thereby making it possible for the terminal to acquire the information at high speeds without being affected by the load at the server side (such as a network or devices)). At this time, since the transmission rate of acquiring the Web document is not affected by the narrow-bandwidth for use at home, full use can be made of the bandwidth of the external link. Inside home where the narrow-bandwidth is available, the Web document is transmitted in the excess narrow bandwidth or in an excess wider bandwidth that is available after the streams have been transmitted. Since the transmission bandwidth of data link becomes narrower inside home, the bandwidth control may be required depending on on-going traffic. For example, take an example where a stream and a Web document are transmitted at the same time (FIG. 2B). The status of FIGS. 2A and 2B is not static but may be changed by the home gateway in response to the number of terminals connected inside home and the type of data link. Both statuses can be determined in accordance with the flow rate of the traffic to inside home and the transmission bandwidth of data link in which transmissions are directed toward the terminals available inside home. Incidentally, since the Web document is automatically stored in the cache area, those contents that can be readily read repeatedly and more frequently used are stored therein on a priority basis. As described above, the bandwidth control is required in general for transmission of contents from a broad-bandwidth data link to a narrow-bandwidth one.

FIG. 3 is an explanatory view illustrating a TV broadcast in which a Web document appears operatively associated therewith. A technique according to the present invention is explained in accordance with an example of a TV broadcast in which the address of a Web document (Uniform Resource Locator: URL) is described, which is related to a broadcast program, as an information distribution service using the Internet. This service allows audio and video to be played back as in a TV broadcast and a Web document to automatically appear in phase with the progress of the program. In order to implement this service, it is necessary to display a Web document at the same time as the TV broadcast on a plurality of home terminals. This may be difficult from the viewpoints of the load of a Web server on the broadcast side and the provision of bandwidth at the home gateway. A method for solving this problem will be explained with reference to FIG. 4 and the subsequent figures. Incidentally, the TV broadcast itself (an AV stream) may be transmitted as a satellite broadcast and a Web document may be acquired using a communication line in accordance with the link information provided for the TV broadcast. The BS digital broadcast delivers related information at the same time with the satellite broadcast. The technique according to the present invention allows the related information to be acquired on the Internet to thereby provide the following usages and effects:

(1) As the related information, use can be made of Web sites on the Internet to thereby employ the information as usual Internet contents.

(2) Introduction of Web sites related to the broadcast.

(3) Use can be made of information on remote areas such as overseas and on local areas at less cost, time, and effort. With the effects mentioned above, Web documents and broadcast programs can be separately prepared, thereby facilitating correction and update of Web documents and allowing user opinions to be reflected readily. The related information can be used for various applications such as music and education.

Figure 4:
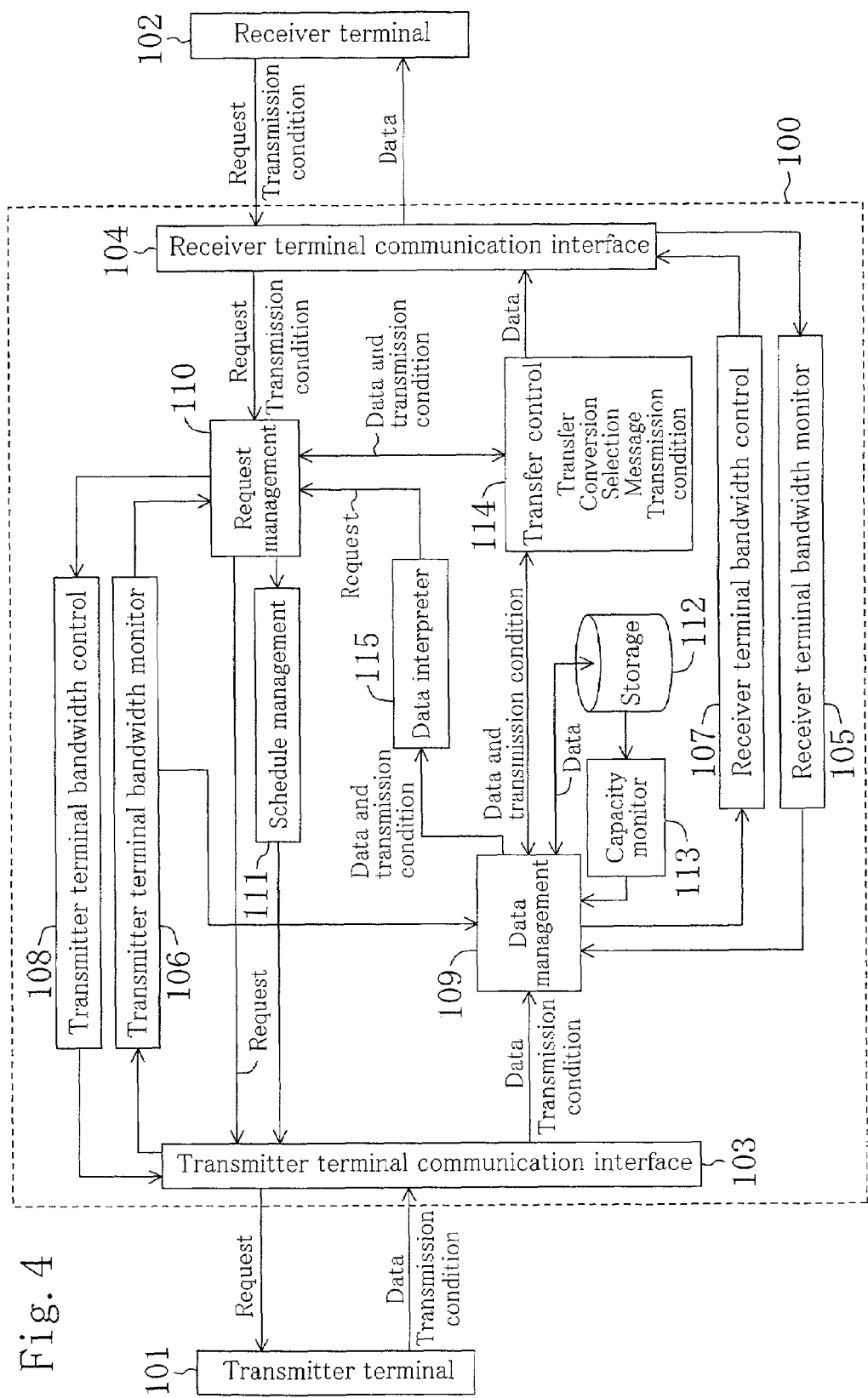
FIG. 4 is an explanatory view illustrating the configuration of an information transmission system according to the present invention.

FIG. 4 is an explanatory view illustrating the configuration of an information transmission system according to the present invention. The information transmission system (gateway) 100 of FIG. 4 is interposed between at least one transmitter terminal 101 and at least one receiver terminal 102. For example, the transmitter terminal 101 may be connected to the information transmission system 100 via a telephone line or an optical fiber or may be a source for supplying a digital broadcast to the information transmission system 100. For example, the receiver terminal 102 may be connected to the information transmission system 100 via a wireless LAN or wired LAN. The information transmission system 100 comprises a transmitter terminal communication interface 103, a receiver terminal communication interface 104, a receiver terminal bandwidth monitor portion 105, and a transmitter terminal bandwidth monitor portion 106. The information transmission system 100 further comprises a receiver terminal bandwidth control portion 107, a transmitter terminal bandwidth control portion 108, a data management portion 109, a request management portion 110, a schedule management portion 111, a storage portion (cache) 112, a capacity monitor portion 113, a transfer control portion 114, and a data interpreter portion 115. Incidentally, a "transmission condition" to appear in the following explanations means the supplementary information of contents, being indicative of a time constraint, communication rate, information on the priority of contents (data), the number of colors and size of the receiver terminal 102, and so on.

The transmitter terminal communication interface 103 transmits a request, in the bandwidth that is controlled by the transmitter terminal bandwidth control portion 108, to the transmitter terminal 101 for transmission of data. The transmitter terminal communication interface 103 also receives data from the transmitter terminal 101. In some cases, the transmitter terminal communication interface 103 receives a data transmission condition from the transmitter terminal 101.

The receiver terminal communication interface 104 receives a request from the receiver terminal 102 for transmission of data. In some cases, the receiver terminal communication interface 104 also receives a data transmission condition from the receiver terminal 102. On the other hand, the receiver terminal communication interface 104 transmits data to the receiver terminal 102 in the bandwidth controlled by the receiver terminal bandwidth control portion 107.

The receiver terminal bandwidth monitor portion 105 monitors the transmission bandwidth of the receiver terminal communication interface 104. The transmitter terminal bandwidth monitor portion 106 monitors the transmission bandwidth of the transmitter terminal communication interface 103. The receiver terminal bandwidth control portion 107 manages and controls the transmission bandwidth of the receiver terminal communication interface 104. The transmitter terminal bandwidth control portion 108 manages and controls the transmission bandwidth of the transmitter terminal communication interface 103.

The data management portion 109 receives data inputted from the transmitter terminal communication interface 103 or acquires data specified by the transfer control portion 114 from the storage portion 112. The data management portion 109 selects at least one of storing the data in the storage portion 112, transferring the data to the transfer control portion 114, or dropping the data, and at the same time sends information on bandwidth control to the receiver terminal bandwidth control portion 107 and information on transfer control to the transfer control portion 114. This is carried out in accordance with at least one of a transmission condition inputted at the transmitter terminal communication interface 103 and sent from the transmitter terminal 101, a transmission condition inputted at the transfer control portion 114 and sent from the receiver terminal 102, information on the receiver terminal bandwidth monitored by the receiver terminal bandwidth monitor portion 105, information on transmitter terminal bandwidth monitored by the transmitter terminal bandwidth monitor portion 106, and information on the storage capacity of the storage portion 112 monitored by the capacity monitor portion 113. In some cases, based on both the specification of data and the transmission condition from the transfer control portion 114, (converted) data is acquired from the storage portion 112. In some other cases, (converted) data from the transfer control portion 114 is stored in the storage portion 112.

In response to the request received by the receiver terminal communication interface 104 from the receiver terminal 102, the request management portion 110 outputs an inquiry of the presence or absence of data to the transfer control portion 114 in conjunction with the transmission condition to allow the transfer control portion 114 to send the stored data in accordance with the transmission condition. If the stored data is not available, the request management portion 110 sends the bandwidth control information to the transmitter terminal bandwidth control portion 108 as well as determines a request procedure. This is carried out in accordance with at least one of the type of data to be requested, the transmission condition acquired from the transfer control portion 114 and sent from the transmitter terminal 101, the transmission condition of the information transmission system 100 acquired from the transfer control portion 114, and information on bandwidth of the transmitter terminal monitored by the transmitter terminal bandwidth monitor portion 106. Then, the request management portion 110 allows the transmitter terminal communication interface 103 to transmit a request to the transmitter terminal 101, outputs a request to the schedule management portion 111 in conjunction with the schedule for transmitting the request, or allows the schedule management portion 111 to output the request that has been held therein. In some cases, the request management portion 110 makes an inquiry to the transfer control portion 114 on whether data has been transmitted in response to the request. Then, depending on the result, the request management portion 110 may allow the schedule management portion 111 to output the request held therein.

The schedule management portion 111 makes the request, to the transmitter terminal communication interface 103, specified by the request management portion 110 at the time or timing specified by the request management portion 110. In some cases, based on the determination of the condition by the request management portion 110, the request management portion 110 outputs the request held by the schedule management portion 111 irrespective of the time specified.

The storage portion 112 stores data. The capacity monitor portion 113 monitors the storage capacity of the storage portion 112.

In response to a request from the request management portion 110, the transfer control portion 114 acquires the requested data from the data management portion 109. In accordance with the transmission condition from the request management portion 110 or the data management portion 109, the transfer control portion 114 acquires and processes data from the data management portion 109 as necessary to transmit the resulting data from the receiver terminal communication interface 104 to the receiver terminal 102. The processing includes conversion, selection (if data is to be selected), and addition of a message or a transmission condition. The message includes that the data has been acquired or cannot be transmitted, the address of the data (which may be the address of the transmitter terminal 101 or the information transmission system 100), and the status of data accumulation (such as the frequency of access). In some cases, the transfer control portion 114 outputs the processed (converted) data to the data management portion 109 and store the data therein. Suppose a transmission condition is attached to the data. In this case, the transfer control portion 114 may rewrite the transmission condition to transmit the resulting transmission condition from the receiver terminal communication interface 104 to the receiver terminal 102 in some other cases according to the circumstances (e.g., by subtracting the time actually consumed from the specified time constraint). In some cases, the transfer control portion 114 may set and output a new transmission condition by itself (irrespective of the presence or absence of a transmission condition). In some other cases, the transfer control portion 114 may acquire the access information of the data from the data management portion 109 in conjunction with the requested data. Still in some other cases, the transfer control portion 114 may acquire, from the data management portion 109, the transmission condition received from the transmitter terminal 101, outputting the transmission condition to the request management portion 110.

The data interpreter portion 115 interprets the description of the data, acquired by the data management portion 109, to extract the data address which will be conceivably requested next and determines the order of requests in accordance with the transmission condition (including the result of bandwidth monitoring), and then makes a request for data to the request management portion 110. For example, the transfer control portion 114 first requests document data and then acquires the document data, thereafter requesting a video stream that requires an excess bandwidth.

Incidentally, the request management portion 110 determines the contents to be acquired (e.g., extracts the upper-class access sites from the past log of the user). Alternatively, when a plurality of data links for acquiring information are available (e.g., one link is via a satellite and the other is via a CATV), the destination data link can be determined based on the average transmission speed provided upon acquirement of data in the past, TTL (Time To Live), and the value of propagation delays.

Figure 5A:
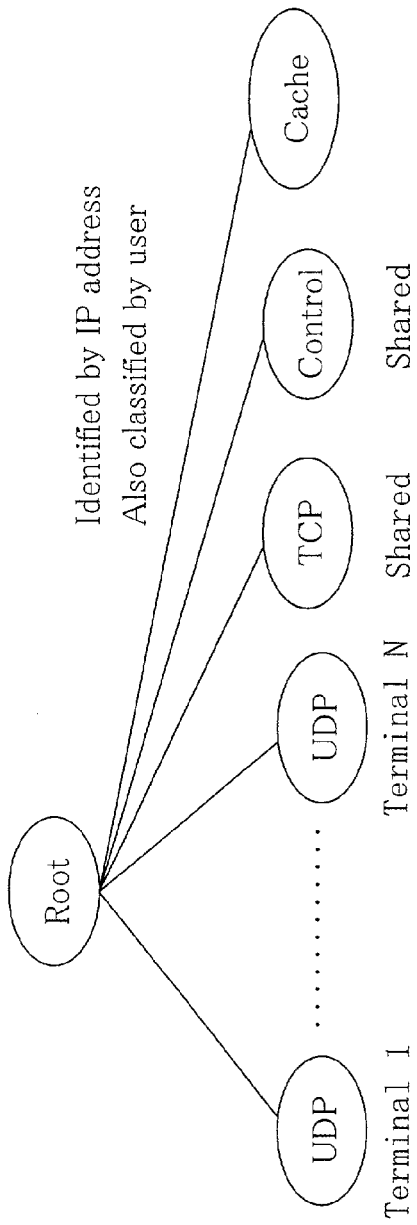
FIG. 5A is an explanatory view illustrating a bandwidth management according to an embodiment.
Figure 5B:
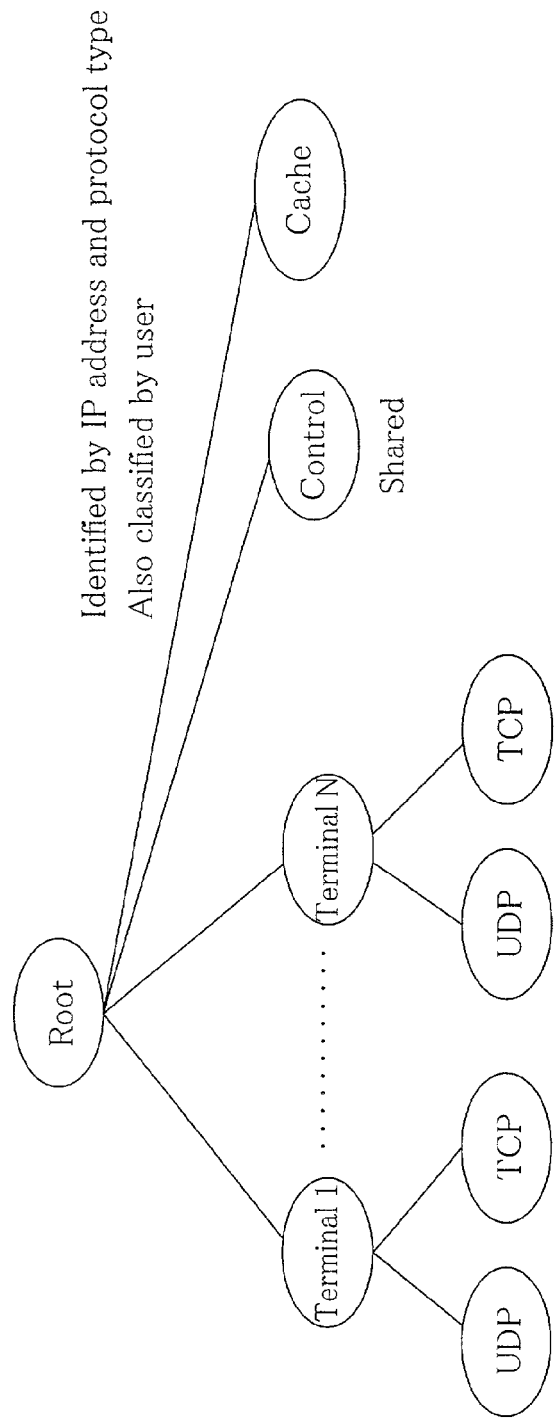
FIG. 5B is an explanatory view illustrating a bandwidth management according to another embodiment.

FIGS. 5A and 5B are explanatory views illustrating the management of bandwidth. There are two methods conceivable for allocating transmission bandwidth. As shown in FIG. 5A, one is a method for defining the service bandwidth of UDP for each terminal or user and the service bandwidth of TCP to be shared by one or more terminals or users in order to manage the transmission bandwidth. As shown in FIG. 5B, the other is a method for defining the service bandwidth of UDP and TCP for each terminal or user in order to manage the transmission bandwidth. An existing queuing algorithm (e.g., CBQ) can be used to allocate bandwidth, thereby making it possible to implement both methods. The bandwidth allocation method includes one for allocating bandwidth in advance at a gateway to the terminals, which are expectedly connected thereto, and the other for allocating or de-allocating bandwidth dynamically between a terminal and the gateway. In either case, bandwidth can be allocated in such a way as to restrict the bandwidth for a transmission from the cache to a terminal (which is considered effective particularly when a narrow bandwidth is employed as shown in FIG. 2B). On the other hand, priorities can be defined for each bandwidth defined. For example, suppose the cache is given a lower class priority and therefore a wider bandwidth is required for transmissions using UDP. In this case, it is possible to prevent transmissions by the cache but give a higher priority to transmissions using UDP.

Figure 6:
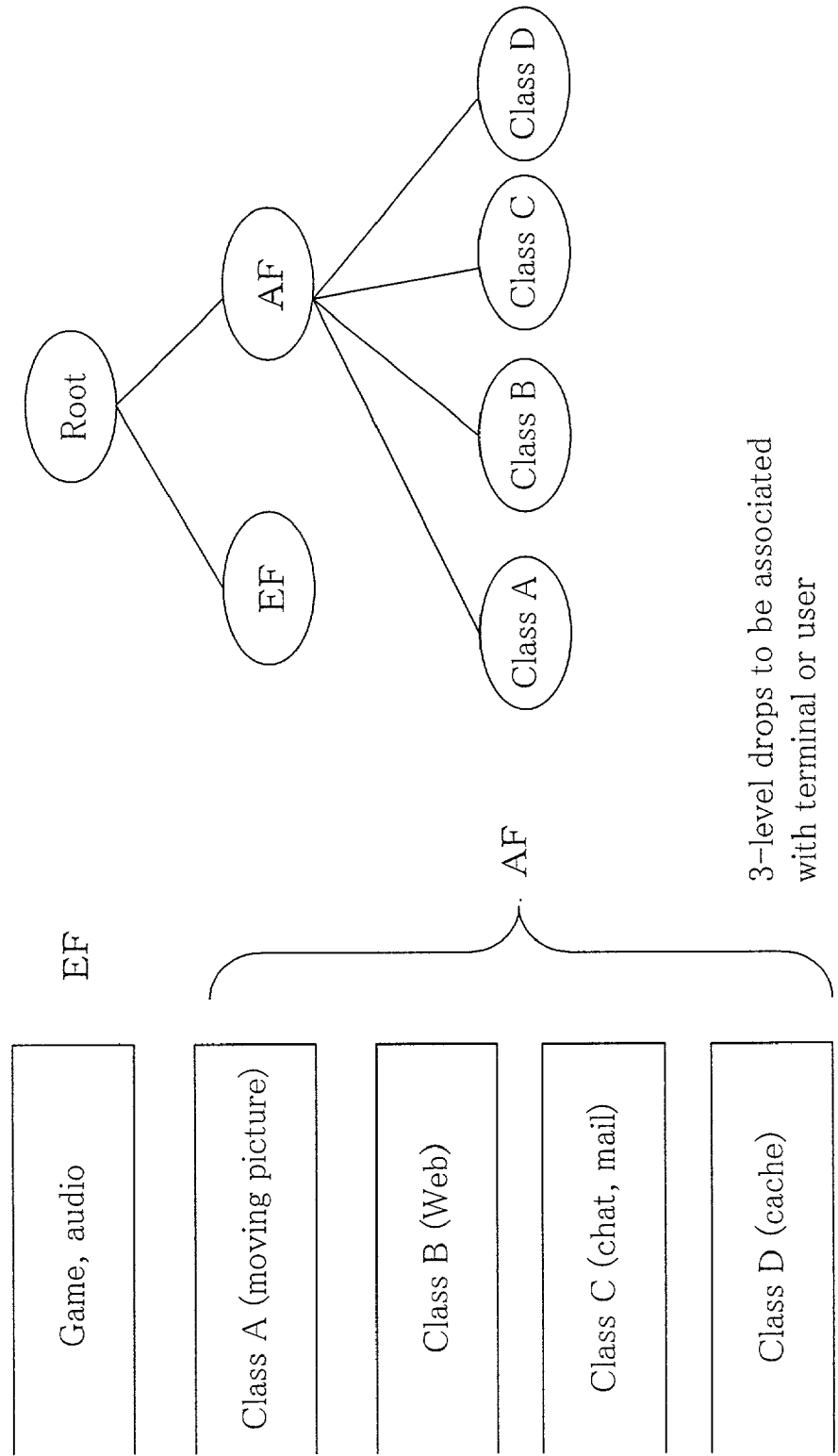
FIG. 6 is an explanatory view illustrating a method for implementing the bandwidth management using DiffServ.

FIG. 6 is an explanatory view illustrating a method for implementing bandwidth management using DiffServ. The DiffServ is a method for dropping a packet at the time of congestion in accordance with the priority given to an IP (Internet Protocol) packet at a router or a gateway (See S. Blake et al., "An Architecture for Differentiated Services", RFC 2475, Internet Engineering Taskforce, December, 1998). The DiffServ has four service classes (AF) and a class (EF) that does not allow for packet drops. In each of the former classes, it is possible to implement three levels of packet drop according to their priorities. In the example of FIG. 6, a game or audio application, which is seriously affected by delays or packet drops, is allocated to class EF. Class AF allocates a class to each application (e.g., class A is allocated to a moving picture). In addition, the three levels of packet drop are associated with terminals or users. For example, processing is performed in such a way that less packet drops are provided for a user who desires a high-quality service. Incidentally, the class of the cache can be defined as shown in FIG. 6.

Figure 7:
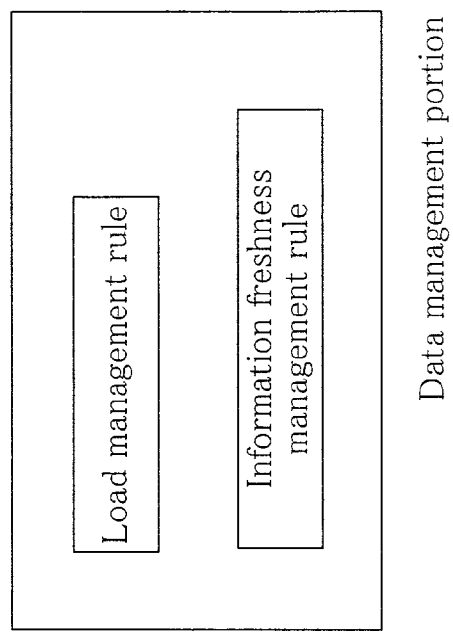
FIG. 7 is an explanatory view illustrating data management.

FIG. 7 is an explanatory view illustrating data management. There are two methods available for managing a storage medium that constitutes the cache. One method is to provide the data management portion 109 with the load management rule that provides a method for accumulating information to reduce the transmission bandwidth used for acquiring information upon acquirement of information. The load management rule manages the acquired information in a storage medium of limited capacity (e.g., a hard disc or SD). The management is carried out according to a determination of the most recent reference time and size of the acquired information, the effective information acquirement speed at which the information has been acquired (in practice, it takes a different length of time to acquire contents depending on the load on the server and the transmission bandwidth available), and the type of media (e.g., moving pictures, audio, or text data). The other method is to provide the data management portion 109 with the information freshness management rule that provides an information accumulation method that improves the freshness of accumulated information upon acquirement of information. The information freshness management rule conducts an automatic acquisition of information in accordance with the most recent recording time and the number of times of reference of the acquired information (an automatic update of accumulated contents).

Figure 8:
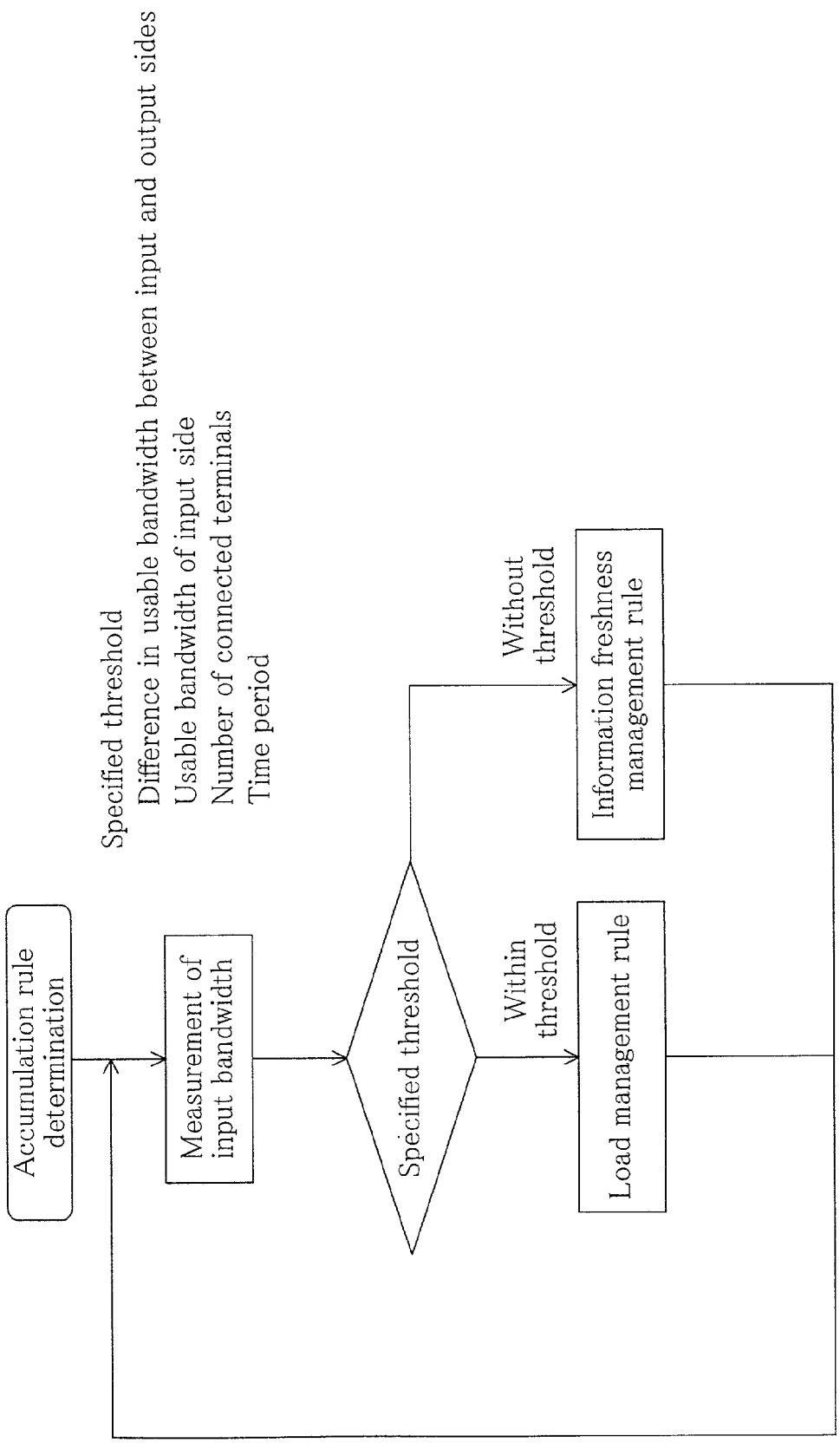
FIG. 8 is an explanatory view illustrating a method for controlling the data management.

FIG. 8 is an explanatory view illustrating a method for controlling data management. The data management portion 109 changes the rule to be employed in response to the transmission bandwidth on the input side (available for use at home). The data management portion 109 also measures the bandwidth of the input side, and manages the information to be accumulated as appropriate, using the load management rule or the information freshness management rule, in accordance with defaults (e.g., the difference in usable bandwidth between the input and output sides, the usable bandwidth of the input side, the bandwidth, the number of connected terminals, and the time period available on the input side). For example, the load management rule is applied when a narrow bandwidth is available on the input side (FIG. 2A), whereas the information freshness management rule is applied when a broad bandwidth is available (FIG. 2B). Incidentally, the aforementioned example shows two algorithms for updating data, however, a single method may be employed. For example, only such information that has been referenced many times during the past one week is to be recorded and other information is to be deleted. In this case, the information that has been referenced earlier is deleted on a priority basis (the same method as this can be applied to a mirror server to be described later with reference to FIG. 19 and the subsequent figures).

Figure 9:
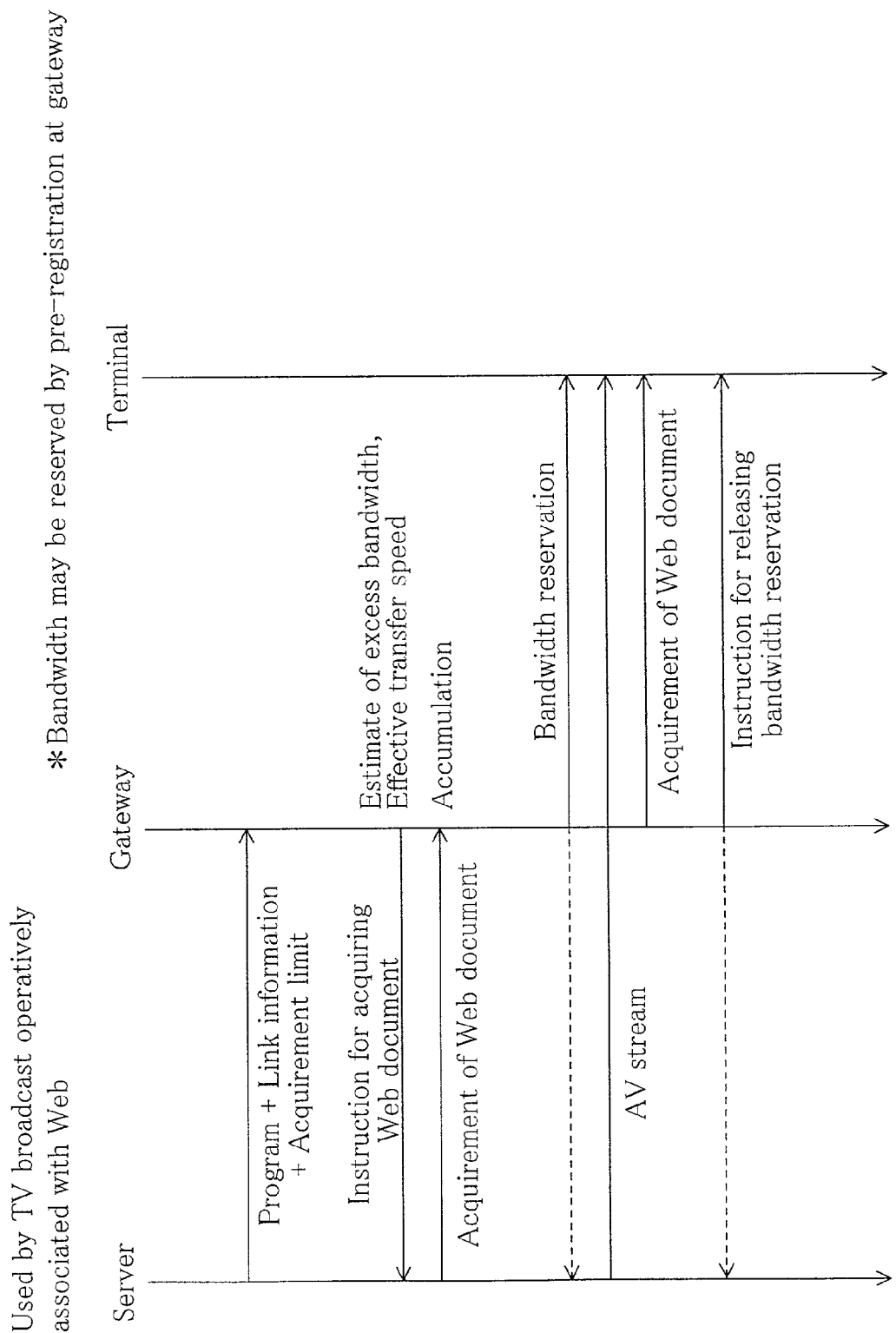
FIG. 9 is an explanatory view illustrating an operation of a TV broadcast in which Web documents appear operatively associated therewith.

FIG. 9 is an explanatory view illustrating the operation of a TV broadcast in which a Web document appears operatively associated therewith. Program information (e.g., program names, performers, broadcast time, and channels) and contents management information indicative of the location (such as of an URL) of program-related information are inputted. Then, the program-related information is automatically acquired and accumulated in advance on the input side (at the gateway or a terminal) before the program is started or in accordance with the progress of the program. Then, the information that has been acquired in advance by the receiver side is presented according to the program rating. The program-related information is automatically acquired in accordance with the availability of excess bandwidth and the effective transfer speed. In this example, bandwidth is reserved at the start of transmission of an AV stream and is released at the end of the transmission. Incidentally, the program that a user is going to watch can be specified by the user in advance or the program that the user may watch can be determined in accordance with the favorite programs the user watched in the past, whereby unnecessary related information has not to be acquired. Different media may be employed for storage in a manner such that the video and audio of a broadcast program, program information, and the location of program-related information are stored in tape media, whereas the actual body of the program-related information is stored in a hard disc. This method makes it possible to implement even a satellite broadcast by combining telephone lines to thereby constitute the system. The transmission method can employ the multi-cast/broadcast or uni-cast.

Figure 10:
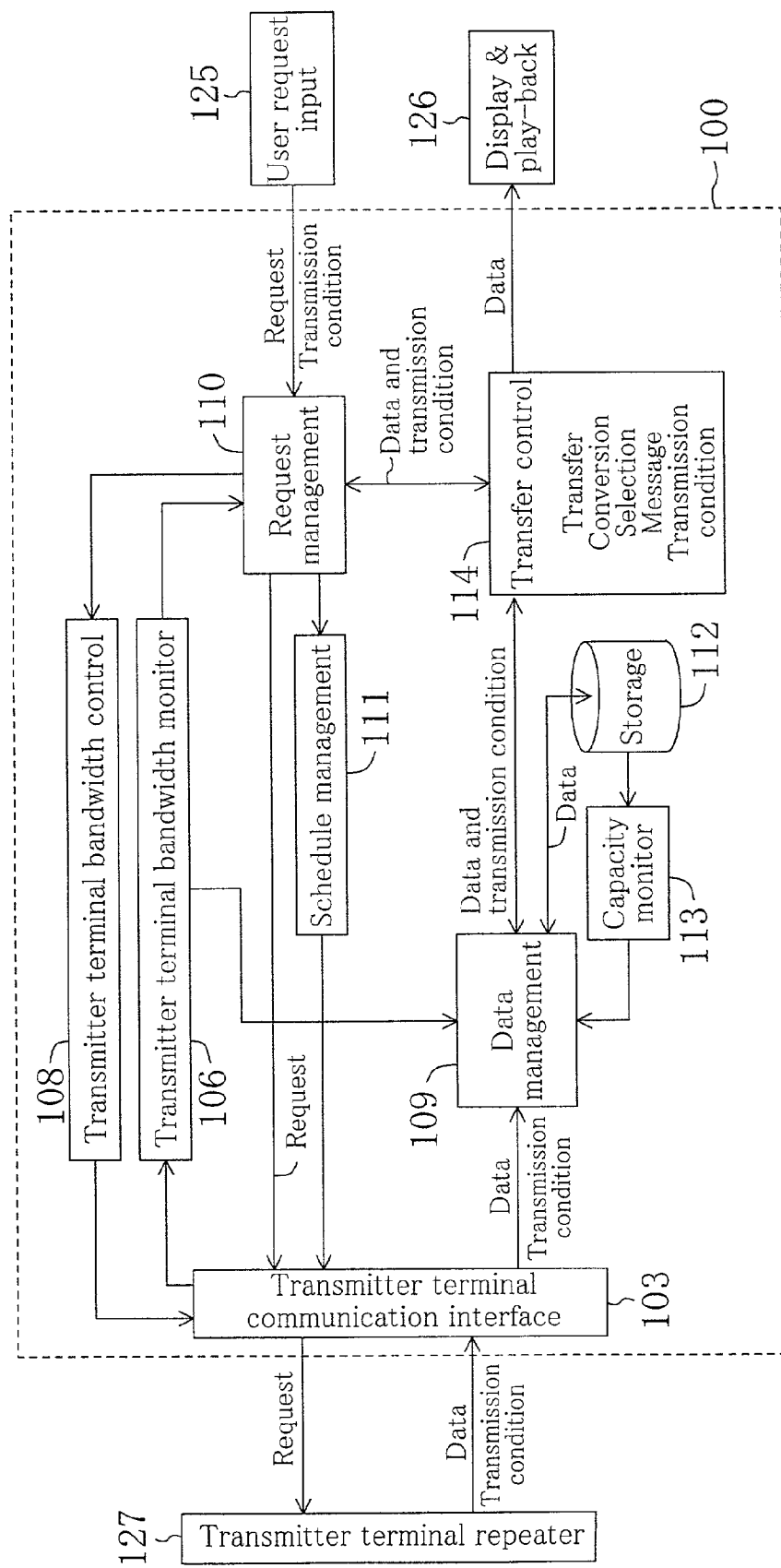
FIG. 10 is an explanatory view illustrating a terminal that is itself provided with the same function as that of the information transmission system of FIG. 4.

FIG. 10 is an explanatory view illustrating a terminal which is itself provided with the same function as that of the information transmission system (gateway) 100 of FIG. 4. In the information transmission system 100 of FIG. 10, the request management portion 110 receives a request for data and a transmission condition from a user request input portion 125, and the transfer control portion 114 transfers the data to a display & play-back portion 126. The transmitter terminal communication interface 103 is connected to a transmitter terminal repeater 127.

Figure 11:
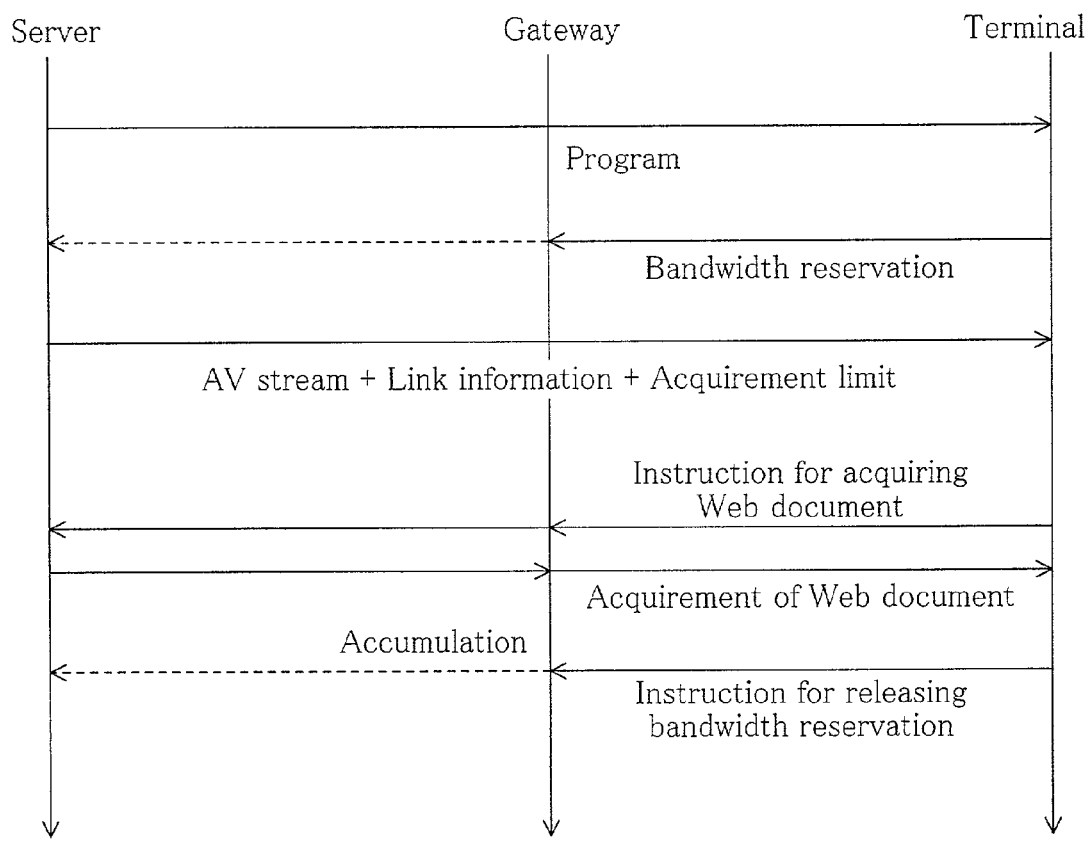
FIG. 11 is an explanatory view illustrating another operation of a TV broadcast in which Web documents appear operatively associated therewith.

FIG. 11 is an explanatory view illustrating another operation of a TV broadcast in which a Web document appears operatively associated therewith. FIG. 11 shows a series of operations in which while the user select a program to receive an AV stream in real time, a Web document is automatically acquired in accordance with the linked information which is provided to the stream and related to the program. This method can be employed when the transmission path and the server have a sufficiently high response speed. Take a television shopping program as an example of specific description of a TV broadcast. In this case, a product presentation is provided in the AV stream, while information on the purchase application or detailed catalog information of products is presented in the Web document. In the case of a drama, the drama is broadcasted in the AV stream, while the performers or the brief outline of the drama are introduced in the Web document. In this case, a bandwidth may be allocated to broadcast the Web document and the AV stream.

Figure 12:
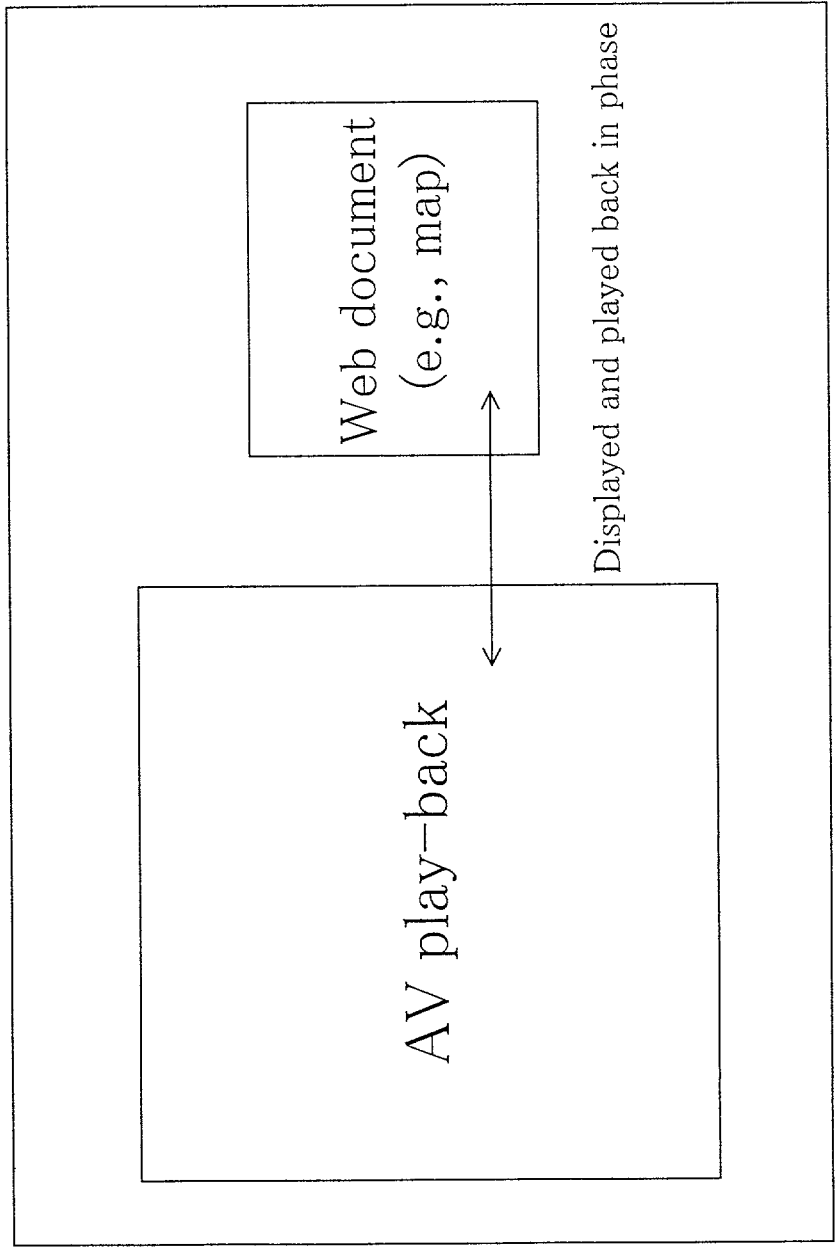
FIG. 12 is an explanatory view illustrating a gateway according to the present invention, applied to a gateway for use in a vehicle.

FIG. 12 is an explanatory view illustrating a gateway according to the present invention, applied to a gateway for use in a vehicle. The gateway according to the present invention, which is applied to a vehicle, allows a Web document to introduce maps or sightseeing guides for showing the sights of surrounding areas, and allows an AV stream related to the maps and the sightseeing guides to be played back at the same time. Incidentally, such an AV stream may be employed that is provided with pictures showing the level of traffic congestion on roads.

Figure 13:
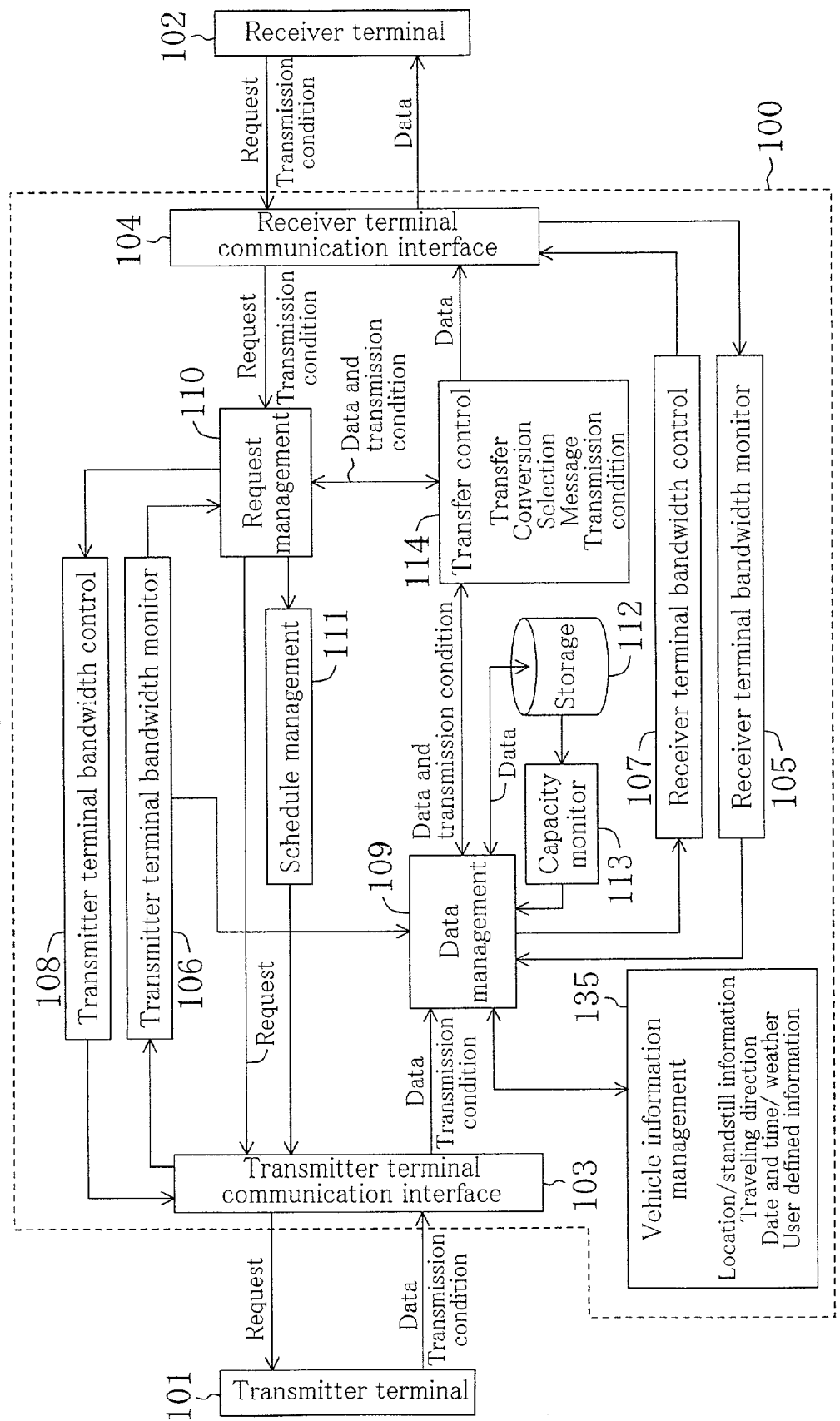
FIG. 13 is an explanatory view illustrating the configuration of a system for implementing the gateway for use in a vehicle.

FIG. 13 is an explanatory view illustrating the configuration of a system for implementing the gateway for use in a vehicle. The information transmission system 100 of FIG. 13 is characterized by comprising a vehicle information management portion 135 for managing at least one or more pieces of information on the position of the vehicle, its standstill status, its traveling direction, date and time, and user-defined information.

Figure 14:
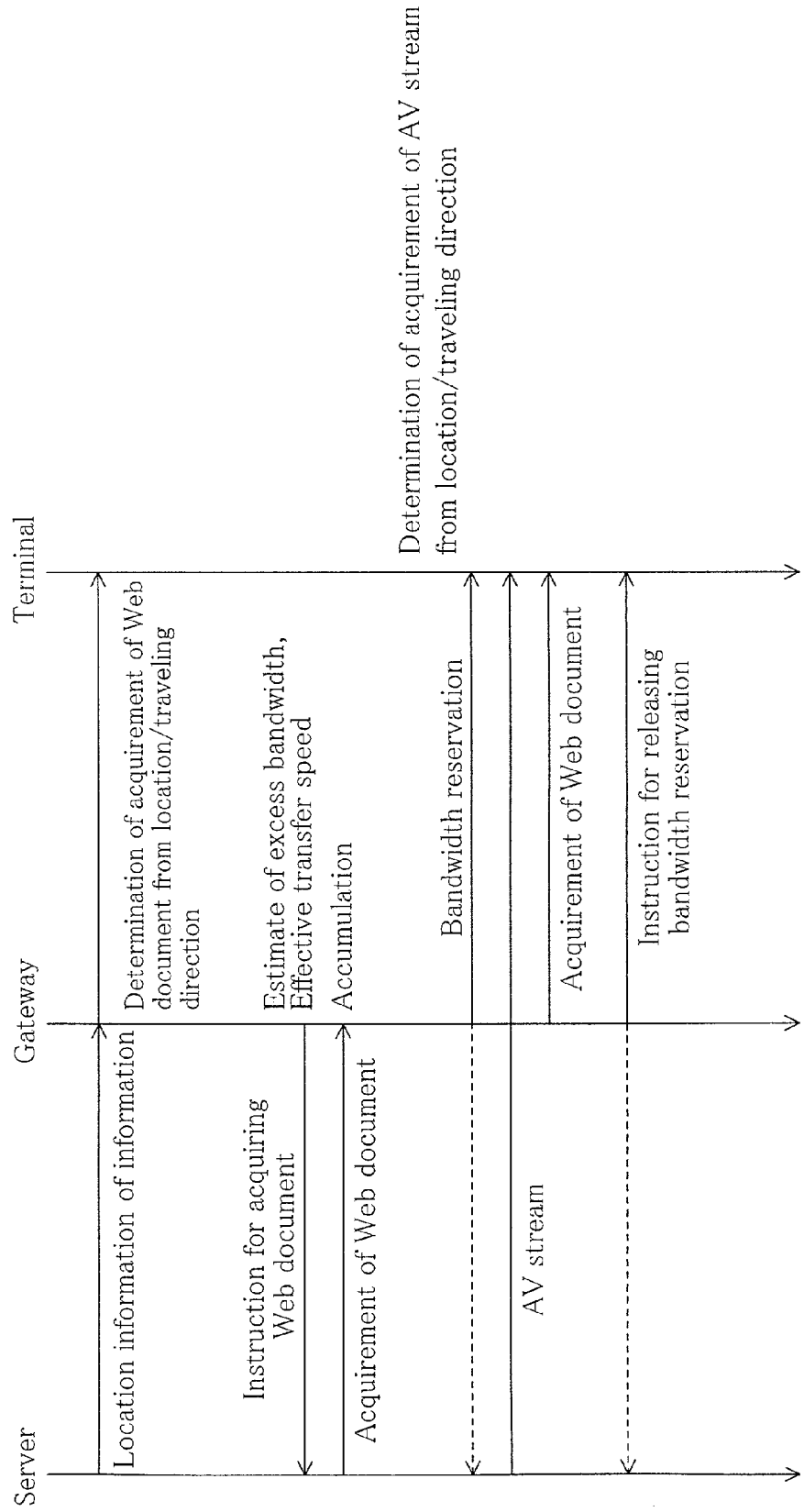
FIG. 14 is an explanatory view illustrating an operation for playing back a Web document and an AV stream simultaneously by operatively associating the position and direction therewith.

FIG. 14 is an explanatory view illustrating an operation for playing back a Web document and an AV stream simultaneously by operatively associating the position and traveling direction of the vehicle therewith. Inputted are program information based on the position information (e.g., longitudes and latitudes, genres, time periods of broadcast programs, charges) and contents management information indicative of the location of program-related information (e.g., an URL). Then, the program-related information is automatically acquired and accumulated in advance on the receiver side (the gateway or a terminal) before the program is started or in accordance with the progress of the program. Then, the information that has been acquired in advance on the receiver side is presented according to the program rating. The program-related information is automatically acquired in accordance with the current position of the vehicle, its traveling direction, the availability of excess bandwidth and the effective transfer speed. In this example, bandwidth is reserved at the start of transmission of the AV stream and is released at the end of the transmission. Incidentally, the program that a user is going to watch can be specified by the user in advance or the program that the user may watch can be determined in accordance with the favorite programs the user watched in the past, whereby unnecessary related information has not to be acquired.

Figure 15:
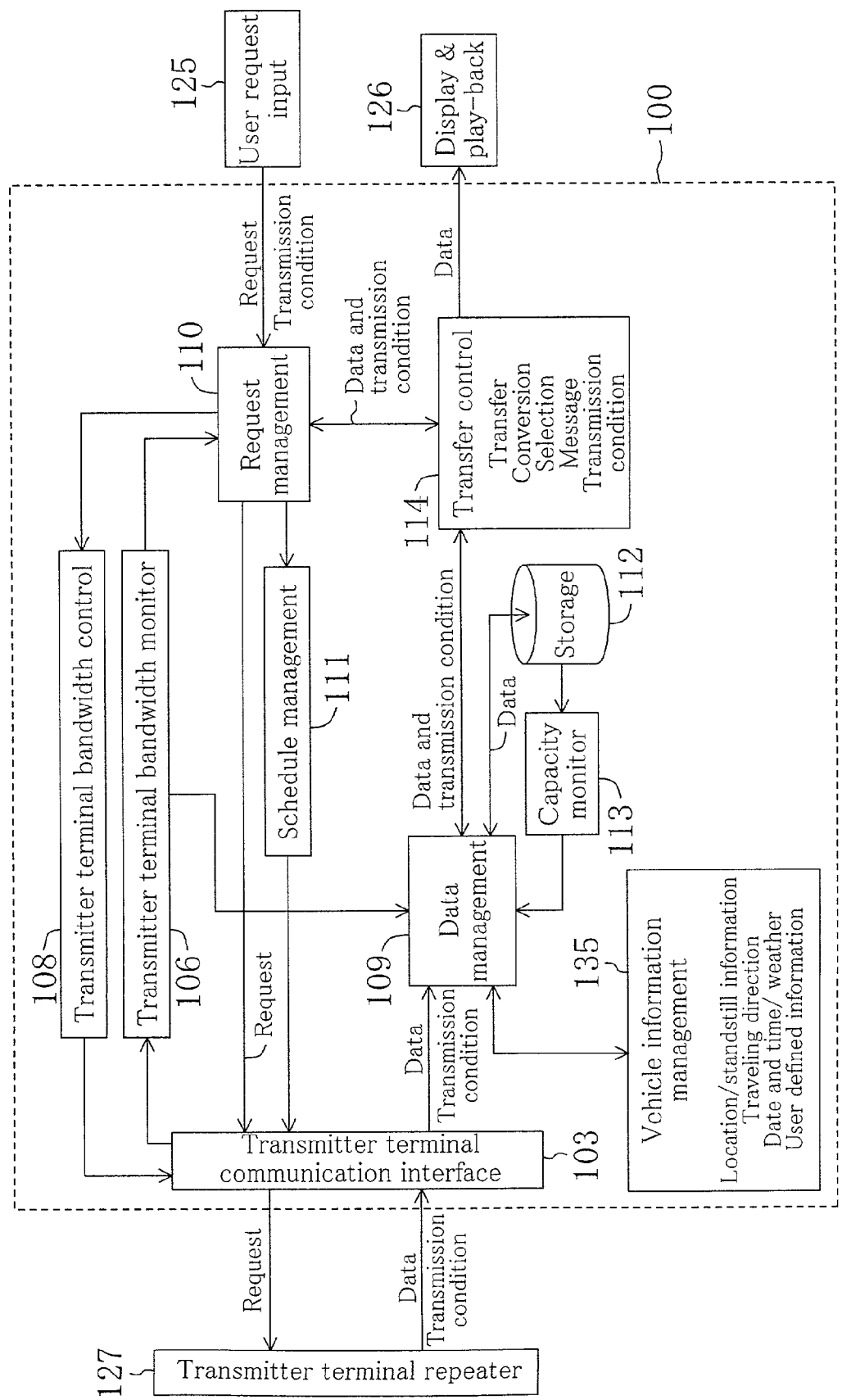
FIG. 15 is an explanatory view illustrating a terminal that is itself provided with the same function as that of the information transmission system of FIG. 13.

FIG. 15 is an explanatory view illustrating a terminal which is itself provided with the same function as that of the information transmission system (gateway) 100 of FIG. 13. In the information transmission system 100 of FIG. 15, the request management portion 110 receives a request for data and a transmission condition from the user request input portion 125, and the transfer control portion 114 transfers the data to the display & play-back portion 126. The transmitter terminal communication interface 103 is connected to the transmitter terminal repeater 127. The vehicle information management portion 135 manages at least one or more pieces of information on the position of the vehicle, its standstill status, its traveling direction, date and time, and user-defined information.

Figure 16:
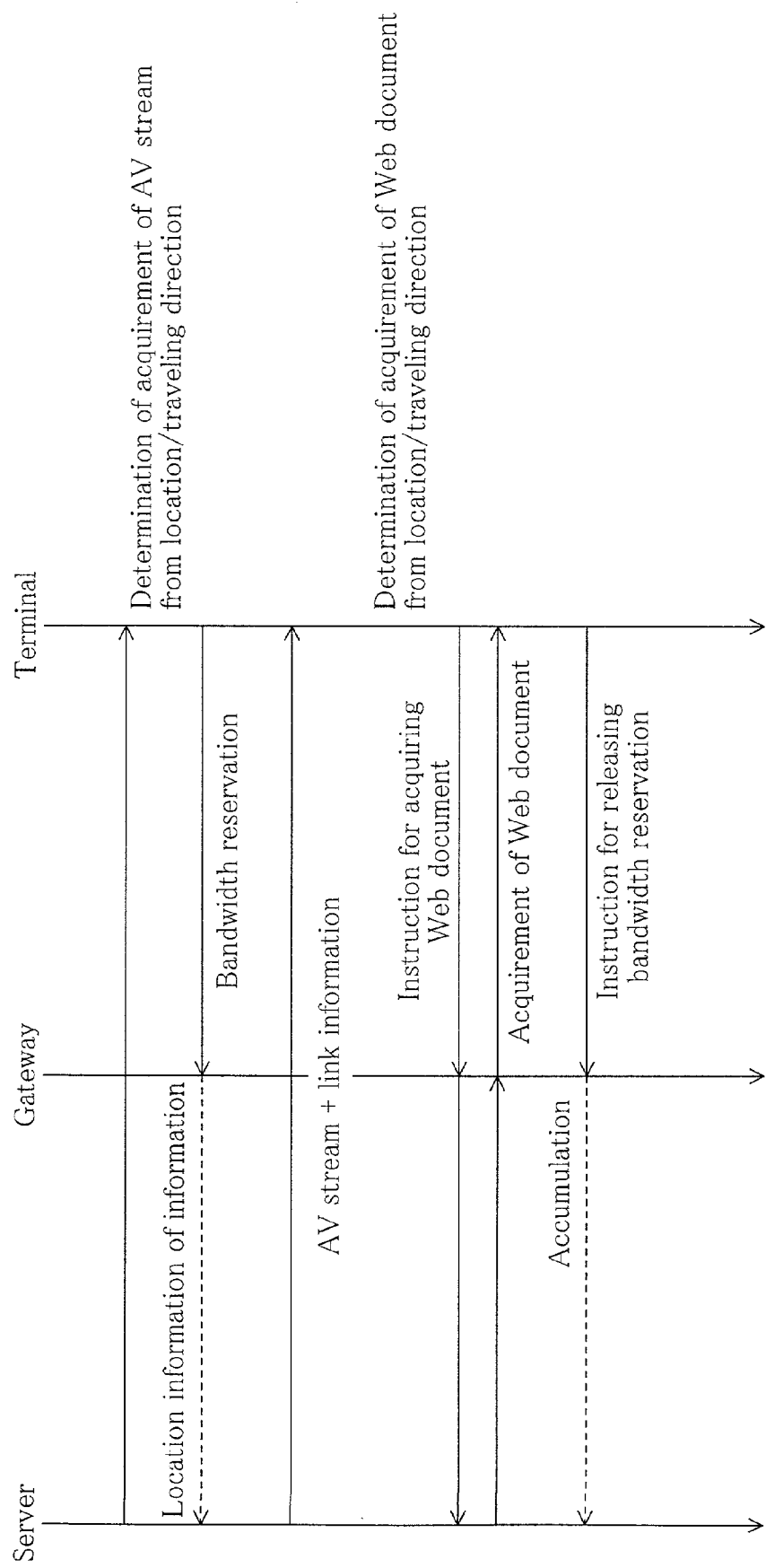
FIG. 16 is an explanatory view illustrating another operation for the simultaneous reproduction of a Web document and an AV stream by operatively associating the position and direction therewith.

FIG. 16 is an explanatory view illustrating another operation for playing back a Web document and an AV stream simultaneously by operatively associating the position and traveling direction of the vehicle therewith. FIG. 16 shows a series of operations in which while the user selects a program to receive an AV stream in real time, a Web document is automatically acquired in accordance with the linked information which is provided to the stream and related to the program. This method can be employed when the transmission path and the server have a sufficiently high response speed. The program-related information is automatically acquired in accordance with the current position of the vehicle and its traveling direction.

Figure 17:
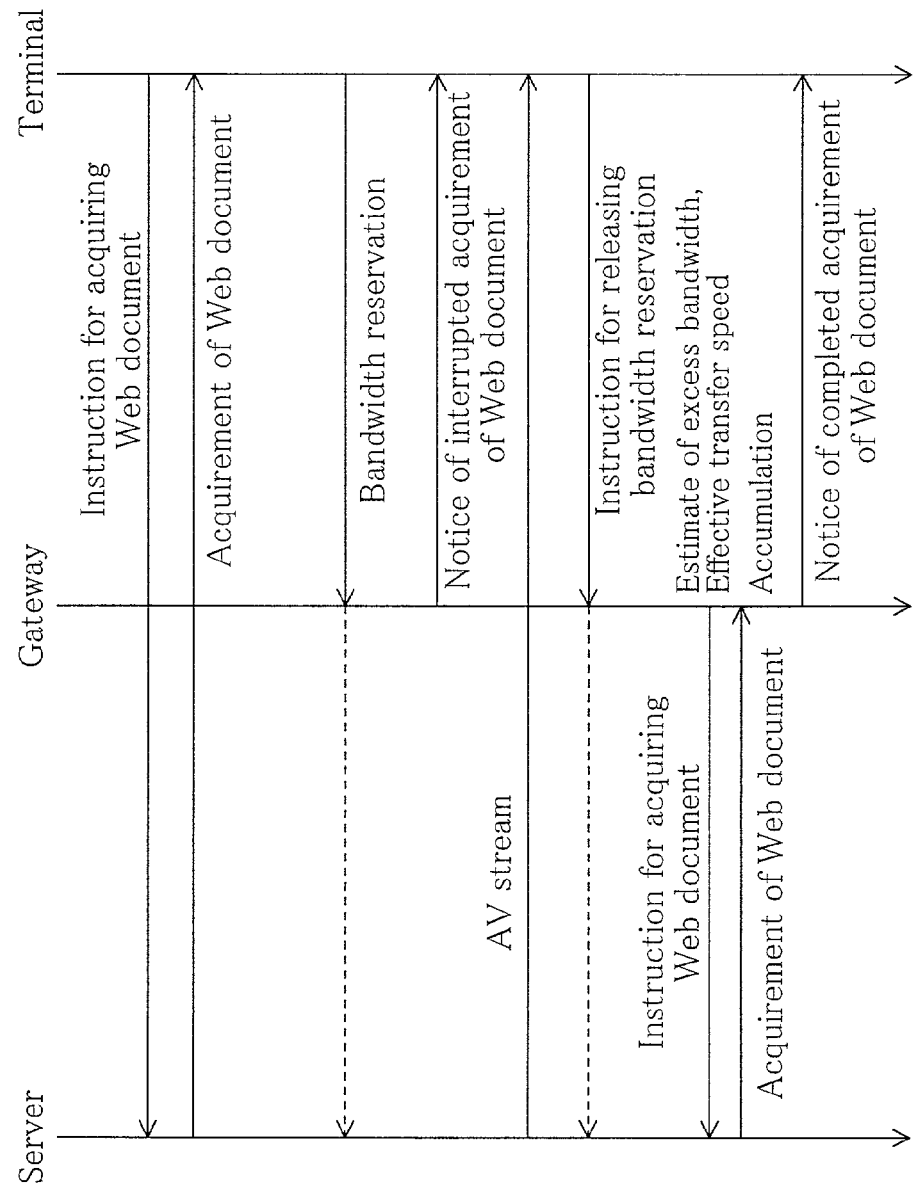
FIG. 17 is an explanatory view illustrating a method for controlling the requests for a Web document and for the transmission of an AV stream, which occur independently of each other.

FIG. 17 is an explanatory view illustrating a method for controlling the requests for a Web document and for the transmission of an AV stream, which occur independently of each other. Suppose a request for acquiring higher acquirement priority contents (e.g., an AV stream) has occurred at the time of acquiring lower acquirement priority contents (e.g., a Web document). In this case, depending on the transmission bandwidth available, the acquirement of the lower acquirement priority contents is interrupted to start acquiring the higher acquirement priority contents. Then, the acquirement of the lower acquirement priority contents is re-started after the higher acquirement priority contents have been acquired.

Figure 18:
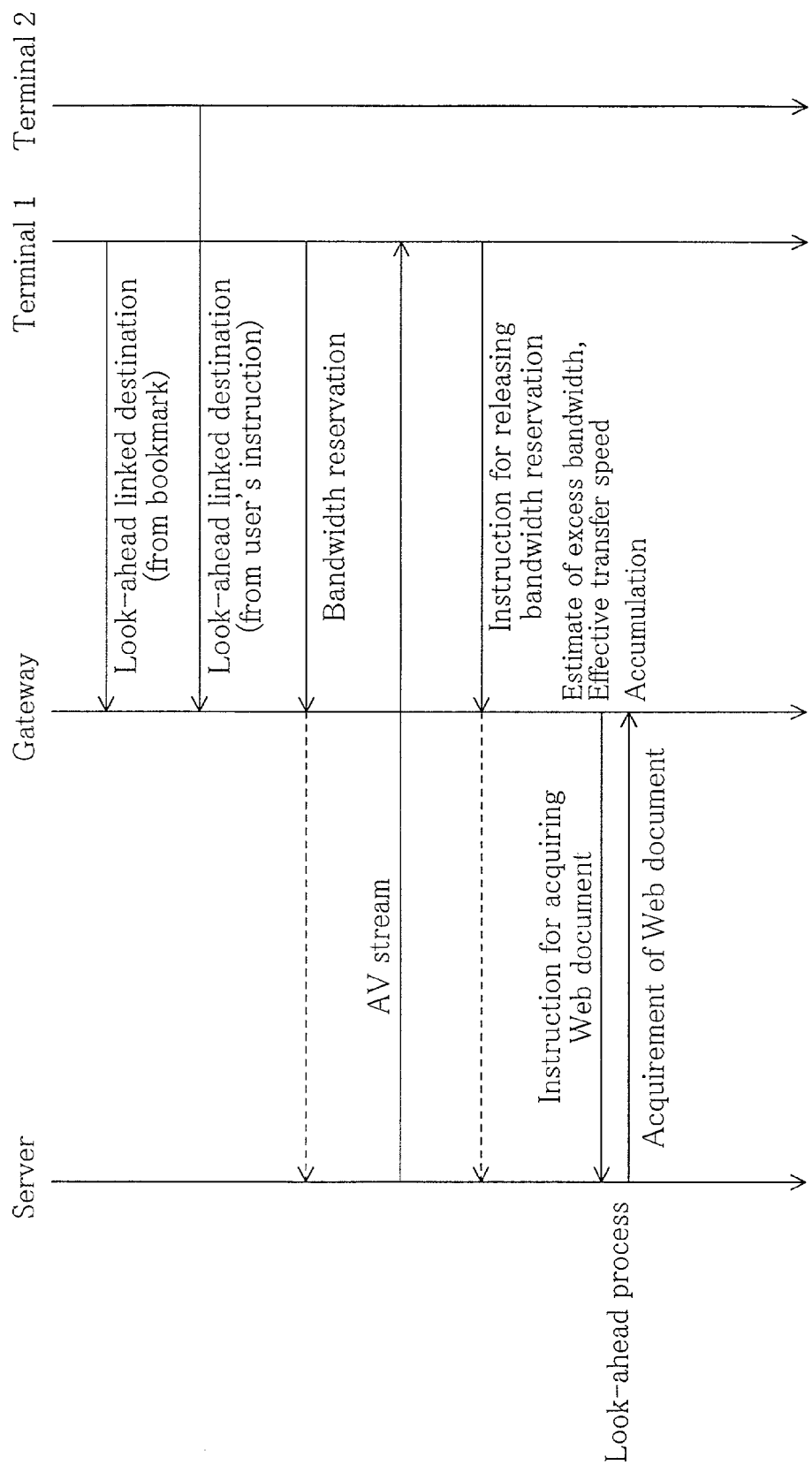
FIG. 18 is an explanatory view illustrating a method for controlling the transmission of contents for a look-ahead.

FIG. 18 is an explanatory view illustrating a method for controlling the transmission of contents for a look-ahead. The source of acquirement of lower acquirement priority contents (e.g., a Web document) is inputted (more specifically, which includes a bookmark defined by the user's browser, a direct instruction provided by the user, or an analysis of access log to the cache). Suppose a request for acquiring higher acquirement priority contents (e.g., an AV stream) is being executed and much bandwidth is used for acquiring higher acquirement priority contents. In this case, the acquirement of the lower acquirement priority contents is executed after the higher acquirement priority contents have been acquired.

Figure 19:
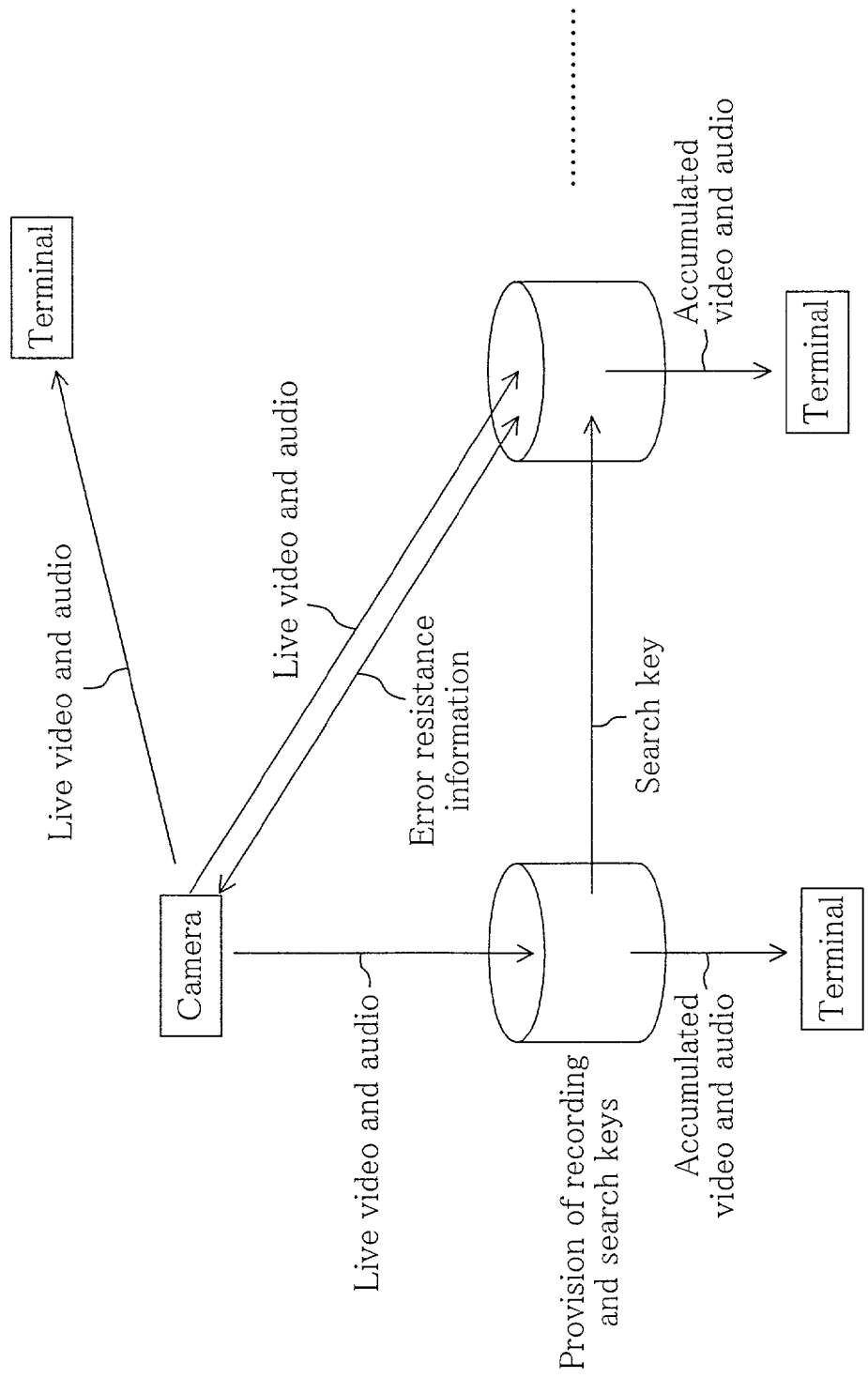
FIG. 19 is an explanatory view illustrating a method for receiving live video and audio to constitute a mirror server.

FIG. 19 is an explanatory view illustrating a method for receiving live video and audio to constitute a mirror server. In delivering video, audio, or a Web document to a number of receiver terminals, there is a problem of access load of the distributor side (server). In a usual case, the access load is distributed over a plurality of servers, which are prepared at each site (e.g., in Japan, U.S.A., or Europe) and provided with the same information. In general, the preparation of the servers that are provided with the same information is referred to as the mirroring of database. Consider a service of providing live video and audio, and a service for accumulating live video and audio for re-use (by providing a search key to call necessary video or audio). To implement these services in a simple manner, each server may individually receive and accumulate the live video and audio to be delivered. For a search key, another server may acquire the search key from the server to which the search key has been provided. Alternatively, the server to which the search key has been provided may transmit the search key to another server. This method can be implemented easily but would make it difficult to effect the management or operation of an increased number of cameras or servers.

Figure 20:
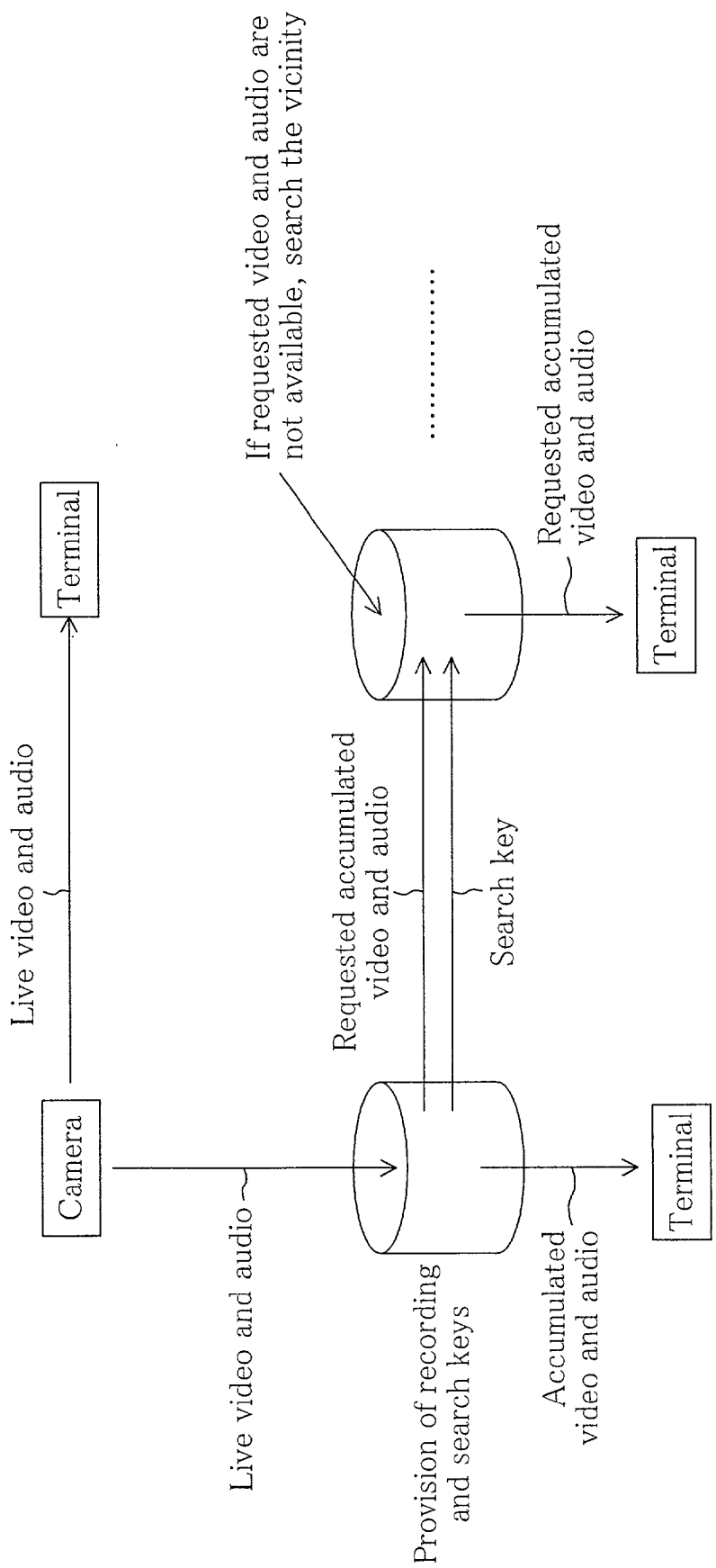
FIG. 20 is an explanatory view illustrating a method for constituting a mirror server in accordance with a user request.

FIG. 20 is an explanatory view illustrating a method for constituting a mirror server in accordance with a user request. This method is a hierarchical cache method which has already been used for transmission of Web documents. At the time of occurrence of a user request, the server of the user searches an adjacent server for requested information. If the requested video and audio are not available there, the server of the user will search another adjacent server (a server of an upper or the same class) to find the requested information. This method with the hierarchical cache presents no problem in the actual body of the video and audio, and the search key. However, since each server is provided with a different database and thus the user has to know which server manages what kind of information, it is necessary to implement a summary or an index function in each server. Such a problem is also encountered that the response speed is reduced when the requested moving picture and audio are not available in an adjacent server.

Figure 21:
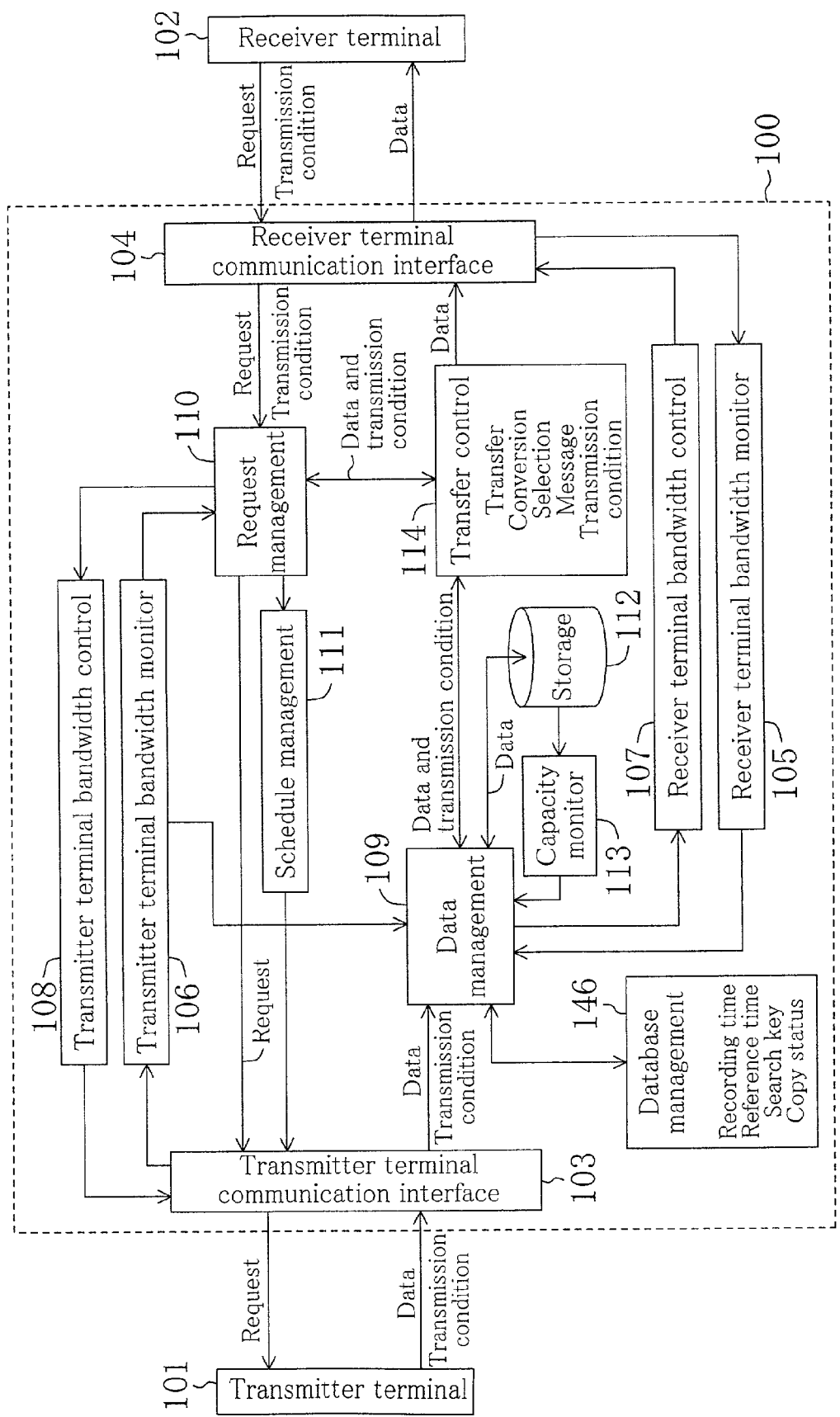
FIG. 21 is an explanatory view illustrating a system configuration for implementing a mirror server using a gateway according to the present invention.

FIG. 21 is an explanatory view illustrating a system configuration for implementing a mirror server. The information transmission system 100 of FIG. 21 is characterized by comprising a database management portion 146. The database management portion 146 comprises at least one of the following portions. That is, the portions include a recording time management portion for managing the time of recording the information acquired and a reference time management portion for managing the time of referencing the information acquired. The portions also include a search key management portion for managing the search key provided to the information acquired (e.g., for managing the correspondence between the information acquired and the search key). The portions further include a copy status management portion for managing the status of copying the information acquired (e.g., for managing the number of times of reference or the timing for synchronizing databases).

Figure 22:
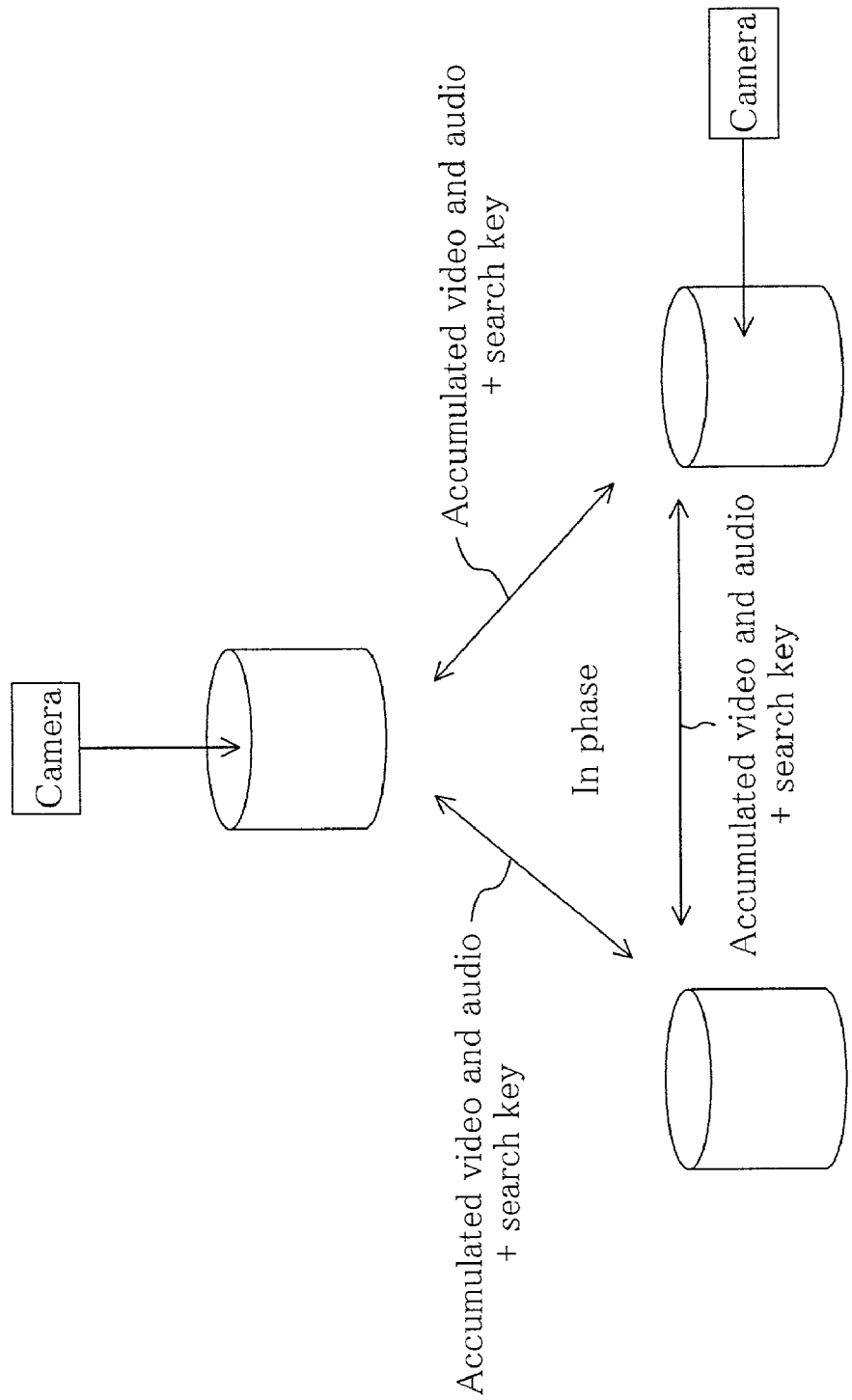
FIG. 22 is an explanatory view illustrating a specific example for constituting a mirror server using a gateway according to the present invention.

FIG. 22 is an explanatory view illustrating a specific example for constituting a mirror server using a gateway according to the present invention. The present invention makes it possible to control transmission bandwidth and storage media operatively associated with each other. This allows a higher priority to be provided to the delivery transmission of live video and audio (bandwidth is allocated to the transmission on a priority basis) and mirroring to be performed in accordance with the availability of transmission bandwidth and effective transmission speed between servers. When much bandwidth is used for the transmission of live video and audio, the transfer of accumulated video and audio is interrupted, whereas a mirroring transfer is re-started when the bandwidth to be used for the transmission of the live video and audio has reduced. Transmissions are not necessarily interrupted for mirroring. Instead, bandwidth control can be performed so as not to interrupt the live transmission.

Figure 23:
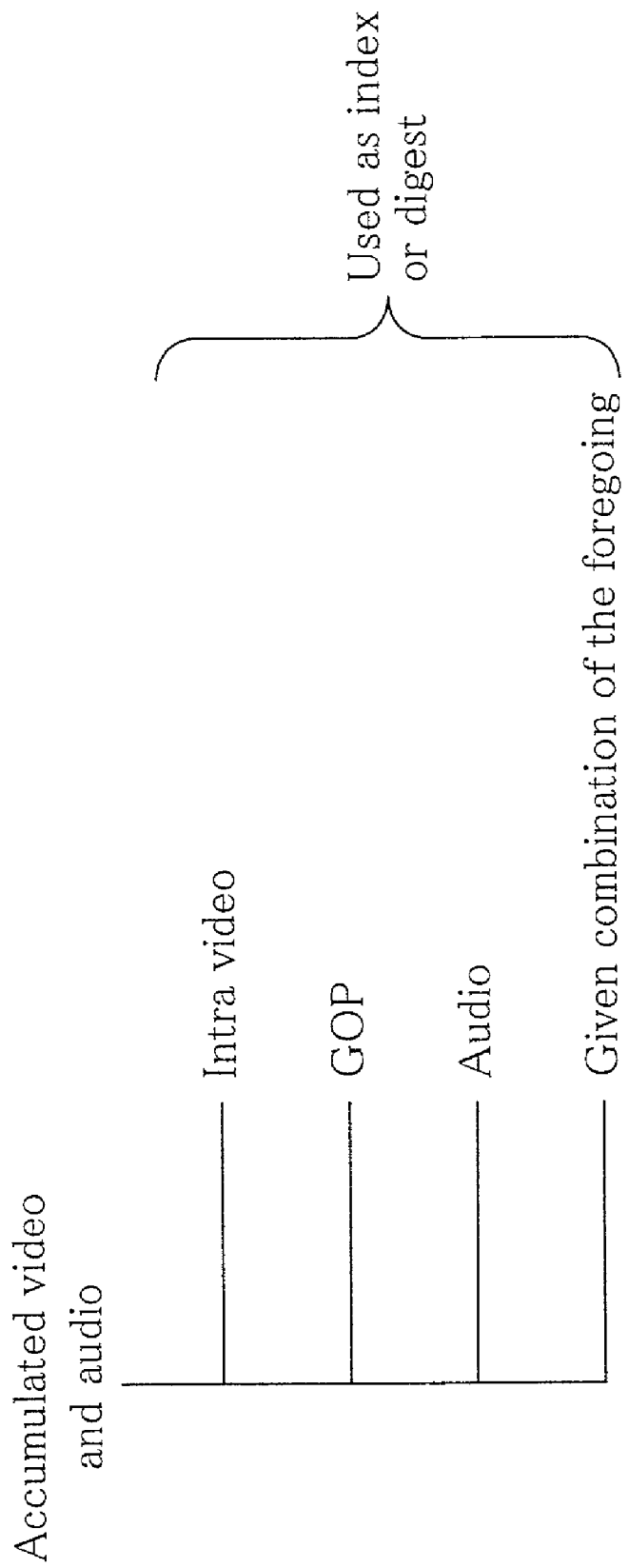
FIG. 23 is an explanatory view illustrating a method for preparing the summary of distributed databases.

FIG. 23 is an explanatory view illustrating a method for preparing the summary of distributed databases. The summary of the information acquired is composed of at least one of intra-coded information containing at least one or more frames of video, a GOP (Group of Pictures), and audio. Then, the summary is copied to and held in two or more of the aforementioned information transmission systems. It is thereby made possible to search easily the recorded video and audio information. The examples to which the present invention described above is applied include "shopping". In this example, an object under consideration for reservation or purchase is photographed or recorded and then delivered over networks in the form of video or audio information (an AV stream of either accumulated or live video and audio). In addition, those who are going to reserve or buy the object are allowed to do so on the network (using a Web document). This makes it possible for those to reserve a seat or a room in a hotel or buy a condominium without actually going to the condominium or a concert hall to check the object. Incidentally, the supplementary information of an photographed object includes control information of a camera (such as switching, action pan, or tilt angle of the camera).

Another example to which the present invention is applied is a "local advertisement" in each local area. In this example, local sightseeing or advertisement information is delivered over networks in the form of video or audio information (an AV stream of either accumulated or live video and audio). In addition, information on a discount bonus may be provided to the aforementioned sightseeing or advertisement information (using a Web document). (The discount bonus may be a coupon for a discount, the number of which displayed on the screen is noted by the user or the hard copy of which is presented at the time of purchase.) This makes it possible to predictably attract more customers.

Finally, take an example in which a stream is transmitted from inside to outside home. In this example, the steam comprises at least video or audio information. Only the actual body or the location of the stream (e.g., a home gateway or a terminal available inside home may be presented on the URL) may be transmitted to a service station (e.g., a provider) over a network. At the service station, the stream is edited to transmit the resulting stream to where it came from or alternatively only the search key resulted from the edition is transmitted to where the stream came from. An edit service can thereby be implemented via a network.

Embodiment 2

Figure 24:
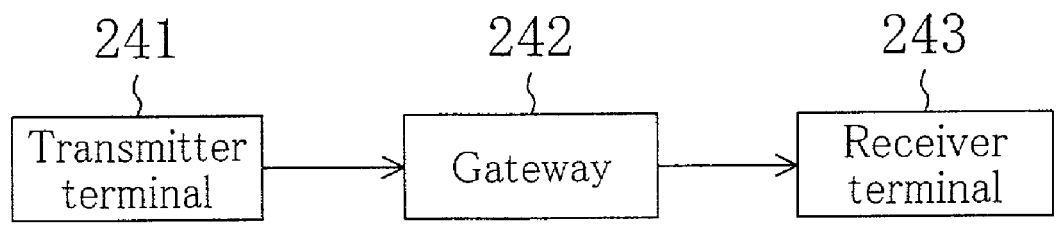
FIG. 24 is a view illustrating the network configuration of second to eleventh embodiments according to the present invention.

An information transmission method according to a second embodiment of the present invention will be explained below. First, the network configuration according to the present invention will be explained with reference to FIG. 24. In the present invention, it is to be understood that one or more gateways 242 for repeating a transmission are interposed between a transmitter terminal 241 for transmitting contents and a receiver terminal 243 for receiving contents. For example, the gateway 242 has the same internal configuration as that of the information transmission system 100 of FIG. 4. In the following explanations, unless otherwise specified, it is to be understood that each embodiment is implemented in the gateway 242 of FIG. 4 and the contents are WWW contents.

Figure 25:
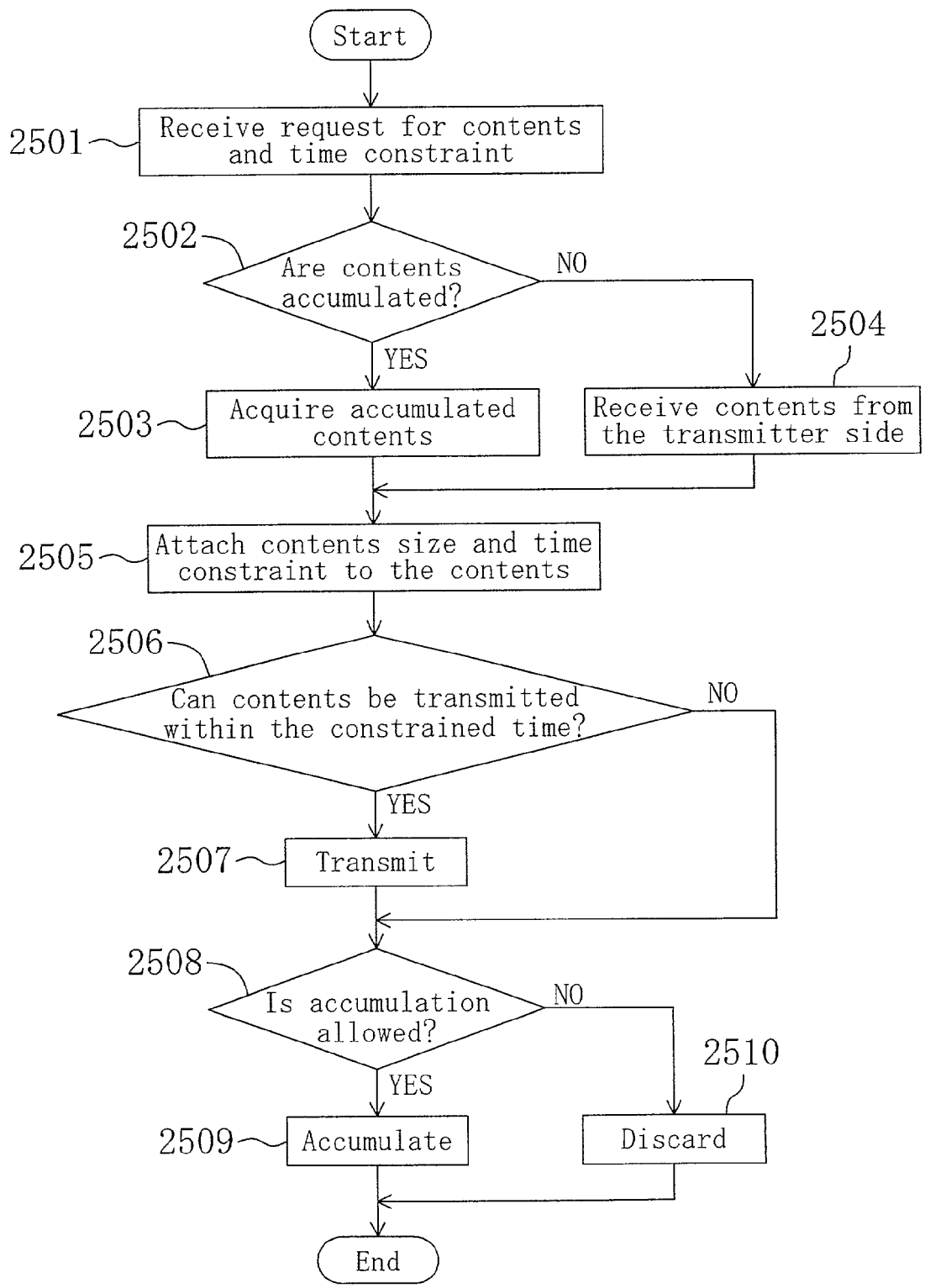
FIG. 25 is a flowchart showing a second embodiment according to the present invention.

The network transmission method according to the present invention is explained with reference to FIG. 25. First, the gateway 242 receives from the receiver terminal 243 a request for contents and a time constraint indicative of within how many seconds to transmit the contents (2501). As shown in FIG. 26, the request for the contents is made using HTTP (Hypertext Transfer Protocol), while the time constraint can be requested using an extended header (Time-Restriction:). In FIG. 26, shown is a request for transmitting "test.jpg" within 20 seconds. Incidentally, HTTP is described in more detail in R. Fielding et al., "Hypertext Transfer Protocol—HTTP/1.1", RFC 2616, Internet Engineering Taskforce, June 1999. Now, it is checked whether the contents are accumulated in the gateway 242 (2502). If true, the accumulated contents are acquired (2503), whereas if not true, the contents are received from the transmitter terminal 241 in which the contents are accumulated (2504). Then, the size and the time constraint of the contents are attached to the contents as supplementary information (2505). If the gateway 242 has determined that the contents can be transmitted within the constrained time (2506), the contents are transmitted (2507). If the contents are stored, this determination is made in accordance with the transmission rate and the size of the contents. For example, let the time constraint be T (sec) the transmission rate R (bits/sec), and the contents size S (bytes). It is not possible to transmit the contents if (8S/R) is less than T. On the other hand, suppose the contents are received by the transmitter terminal 241. In this case, the reception causes the constrained time to be wasted, thereby decreasing the possibility of transmitting the contents within the constrained time.

If it is allowed to accumulate the contents (2508), the contents are accumulated in the gateway 242. The HTTP of version 1.1 provides a header of "Cache-Control:". If a header "Cache-Control: no-cache" is provided by the transmitter terminal 241, it is not allowed to accumulate the contents and thus the contents are dropped (2510). Other contents are accumulated in the gateway 242 (2509).

When contents are first requested, the contents are not accumulated in the gateway 242. This may cause time to be wasted for receiving the contents from the transmitter terminal 241 and result in increasing the possibility of dropping the transmission of contents due to dissatisfaction of the time constraint. However, since the contents are accumulated in the gateway 242, the second or subsequent request for the same contents would immediately allow the transmission of the contents from the gateway 242, thereby increasing the possibility of satisfying the time constraint.

Embodiment 3

Figure 27:
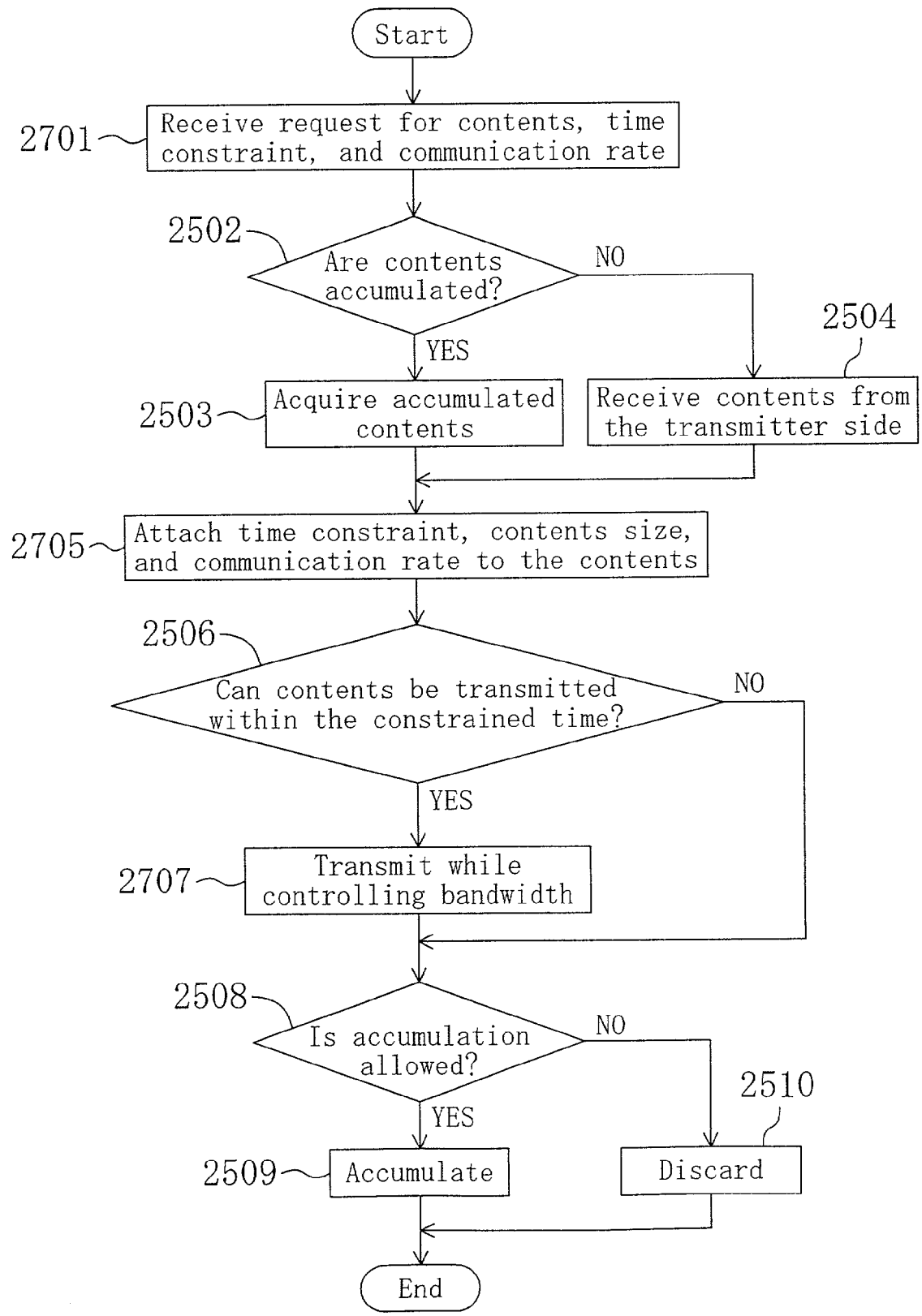
FIG. 27 is a flowchart showing a third embodiment according to the present invention.

Now, an information transmission method according to a third embodiment of the present invention will be explained below with reference to FIG. 27. First, the gateway 242 receives from the receiver terminal 243 a request for contents and a communication rate or time constraint, which the receiver terminal 243 can ensure for the transmission of the contents (2701). As shown in FIG. 28, the request for the contents is made using HTTP. The communication rate and the time constraint can be requested using extended header of "Band-Width:" and "Time-Restriction:", respectively. In FIG. 28, shown is a request for transmitting "test.jpg" at a communication rate of 64 kilo-bits/sec.

Now, the contents are acquired as in the second embodiment (2503, 2504). The size, time constraint, communication rate of the contents are attached to the contents as supplementary information and then the contents are transmitted at the specified communication rate (2707). When a specified communication rate is available, the contents are transmitted at the communication rate. When a specified size S and constrained time T of the contents are available, it is possible to satisfy the time constraint if the contents are send at a communication rate higher than determined by 8S/T. When a specified communication rate R, contents size S, and constrained time T are all available, the contents can be transmitted at a communication rate greater than or equal to the communication rate R if 8S/T is less than T, whereas no transmission is possible if not. However, when contents other than those accumulated are to be transmitted, it is necessary to receive the contents from the transmitter terminal 241, thereby time to be wasted for the reception of the contents. With a reception rate lower than the specified transmission rate, it is impossible to transmit the contents at a speed greater than the reception rate. When accumulated contents are to be transmitted, it is not necessary to receive the contents from outside, thereby making it possible to set an arbitrary transmission rate.

Embodiment 4

Now, an information transmission method according to a fourth embodiment of the present invention will be explained below. As shown in FIG. 29, on the receiver terminal 243, specified are "test.html" and the priority of two images "test1.jpg" and "test2.jpg", which are contended therein, using an extended header "Priority:" of HTTP. In response to this transmission request, the gateway 242 carries out transmissions in descending order of priority. In the case of FIG. 29, sent first is the "test.html" or a document to be based upon and then the image "test2.jpg". Even if a failure occurred at the time of transmitting "test2.jpg", damage due to the failure could be minimized if the user wants to view the "test2.jpg" more than the "test1.jpg". As another method for allowing the receiver terminal 243 to provide priority, such a method may be employed in which the order of transmission of requests from the receiver terminal 243 is arranged in a priority sequence. In addition, if the transmitter terminal 241 provides priority, it is made possible to transmit on a priority basis the information which the transmitter terminal 241 wants to show.

A multi-medium document containing an image has been taken as an example here. Nevertheless, for book-type contents with chapters, priority may be given to each chapter, thereby making it possible to transmit the index or an important chapter on a top-priority basis or receive the most interested chapter first.

Embodiment 5

Now, an information transmission method according to a fifth embodiment of the present invention will be explained below with reference to FIG. 30. First, the gateway 242 receives from the receiver terminal 243 all of a request for contents, a communication rate, and a time constraint (2701). It is then checked whether accumulated are the requested contents having the size that can be transmitted at the specified communication rate and within the specified length of time (3002). If true, the contents are transmitted (3004). If not true, it is checked whether the requested contents themselves are accumulated (3003). If true, the contents are acquired (2503), whereas if not true, the contents are received from the transmitter terminal 241 (2504). Then, the size of the contents is attached to the contents as supplementary information (3005) and then the contents are accumulated as non-converted contents (3006). The resulting non-converted contents are converted so that the size S is less than 8RT with respect to the time constraint T and communication rate R (3007). For image contents, the size of the image may be reduced, the number of colors may be reduced, or the image may be compressed to change their format, thereby making it possible to reduce the size of the contents. The converted contents are attached with the size of the converted contents as a conversion condition and the name of the non-converted contents as supplementary information (3008), and then accumulated (3009). The resulting converted contents can be transmitted at the specified communication rate within the specified length of time.

The accumulated converted contents are thus transmitted, thereby making it possible to carry out the transmission immediately without wasting time for conversion. In addition, even when converted and accumulated contents are not available, non-converted contents can be converted, thereby never wasting transmission time for receiving contents from the transmitter terminal 241.

Figures 31, 32, 33:
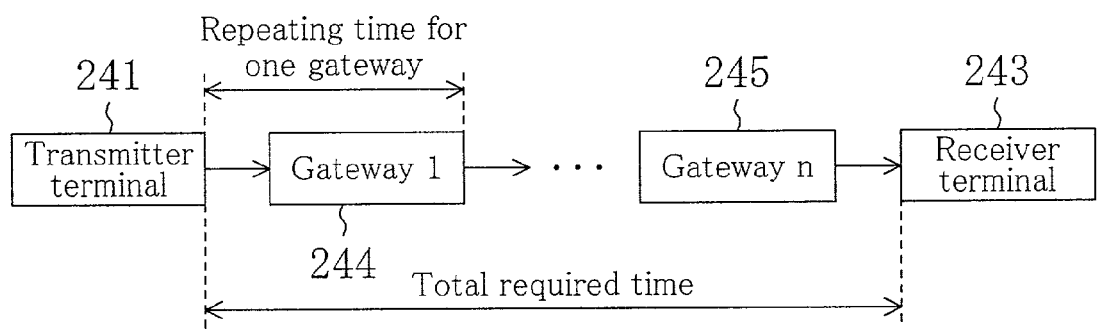
FIG. 31 is a view illustrating an example of a description of supplementary information.
FIG. 32 is an explanatory view illustrating time constraints.
FIG. 33 is a view illustrating an example of a description of supplementary information.

Such an example is shown in FIG. 31 in which the screen size and the number of display colors of the receiver terminal 243 are provided to the converted contents as supplementary information. Using an extended header of HTTP, the lateral width of the screen (Terminal-Width: 800) and the transverse width (Terminal-Height: 600) in dots, and the number of colors (Color-Depth: 16) in bits (16 bits=65,536 colors) are transmitted from the receiver terminal 243 to the gateway 242 in conjunction with a request for contents. Then, the gateway 242 reduces the size of the image so as to suit this size. With this information being accumulated in conjunction with the converted contents, it is made possible to respond to such a request for contents that is sent from a terminal of the same performance.

Incidentally, depending on the time required for conversion and transmission, such a case is conceivable in which the conversion and transmission within a constrained time are made impossible, such as in cases where a plurality of contents are transmitted or contents pass through many gateways. In theses cases, instead of transmitting contents, a message "Transmission has been aborted since conversion cannot be made" is sent. This is made possible by making use of an extendable status code of HTTP.

Embodiment 6

Now, an information transmission method according to a sixth embodiment of the present invention will be explained below. An example of time constraint is shown in FIG. 32. Two types of time constraints are conceivable: the total time during which the transmitter terminal 241 transmits contents and the receiver terminal 243 receives the contents, and the time required for repeater processing at a gateway. As shown in FIG. 33, these two types of time constraints can be specified using an extended header of HTTP. In FIG. 33, the total time is constrained to 20 seconds and the time for repeater processing per one gateway is constrained to 5 seconds.

Figure 30:
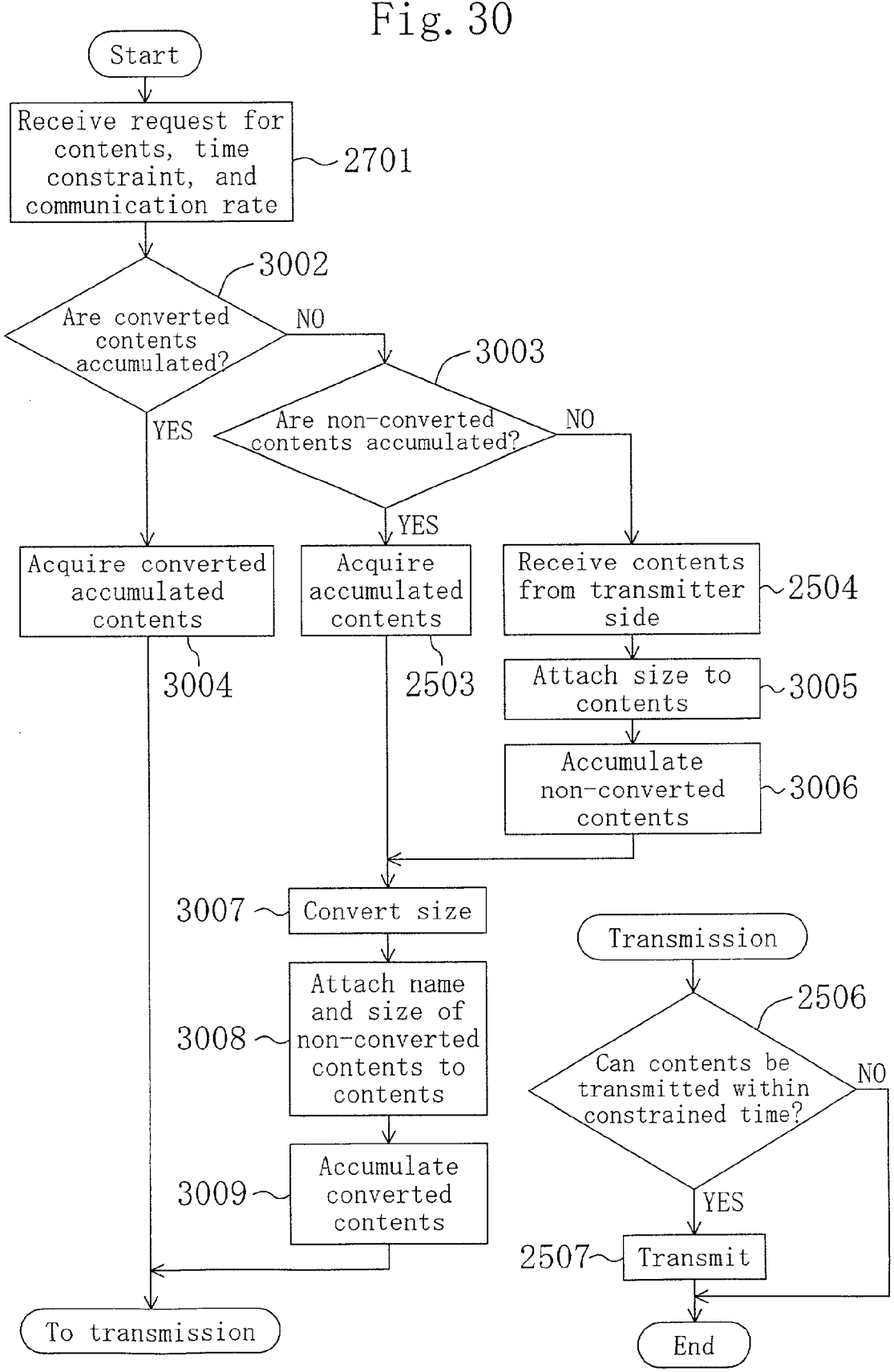
FIG. 30 is a flowchart showing a fifth embodiment according to the present invention.
Figure 34:
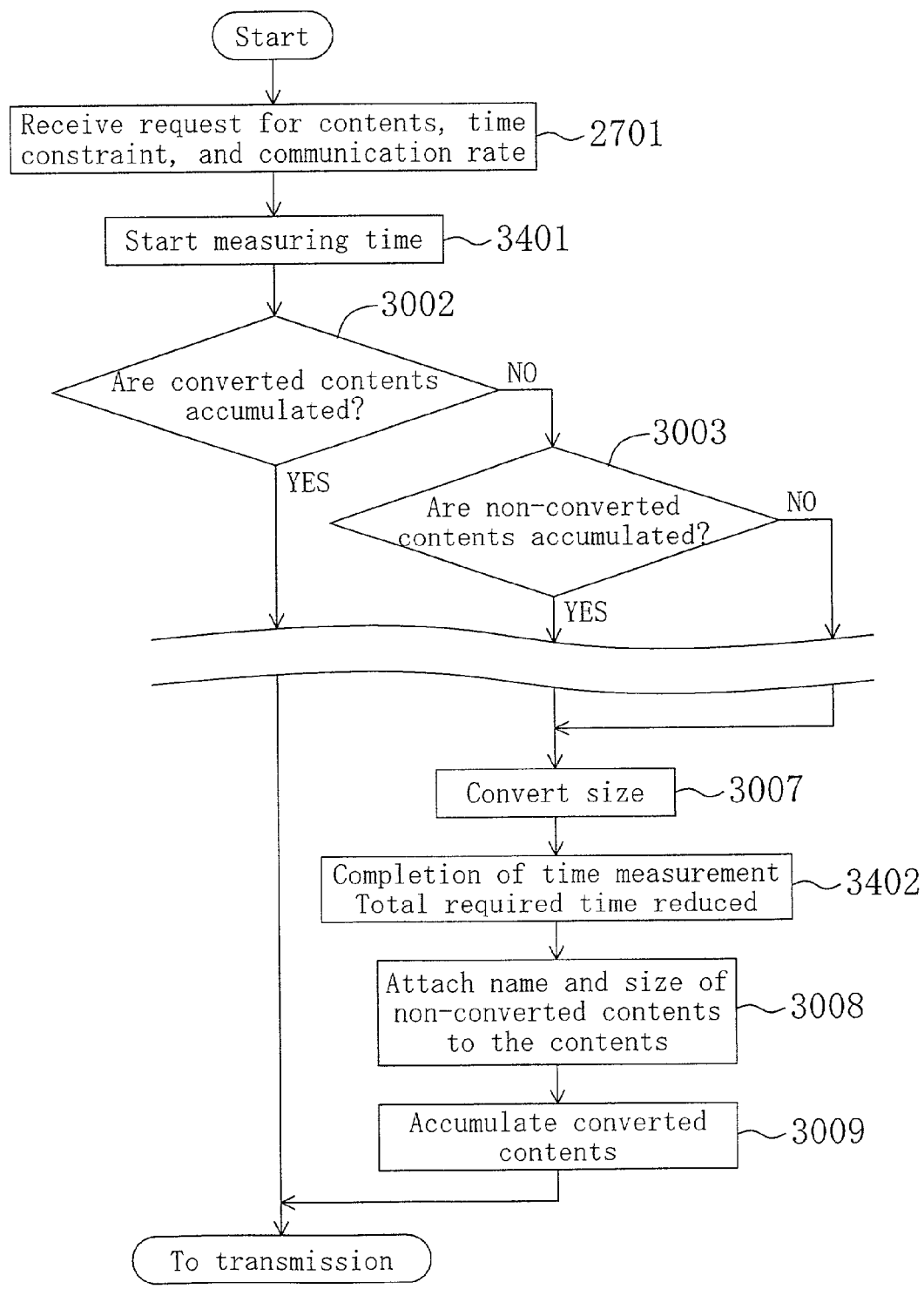
FIG. 34 is a flowchart showing a sixth embodiment according to the present invention.

FIG. 34 shows an example of time constraint processing of the fifth embodiment (FIG. 30). The measurement of required time is initiated (3401) after a request for contents has been received (2701). It is checked whether converted contents are accumulated (3002). If converted contents are accumulated, transmission processing can be immediately initiated and therefore the received time constraint can be employed as a conversion condition for the check. If accumulated converted contents are not available, it is then checked whether accumulated non-converted contents are available (3003). In this case, if the time possibly required for a size conversion (3007) can be estimated, the expected conversion time is subtracted from the received time constraint, thereby making it possible to estimate the time to be taken for transmission more accurately. A conversion condition for an actual size conversion (3007) may be the remaining time given by subtracting the actual required time and the expected conversion time from the received time constraint. After the size conversion (3007) has been completed, the measurement of required time is also completed to derive a new total required time from the subtraction of the resulting measured required time from the received total required time (3402), the new total required time being attached to the contents as new supplementary information (3008).

In many cases, the time constraint sent from the receiver terminal 243 is presumably equal to the total time (total required time) to be taken for the acquirement of contents. However, since the total required time alone provides no allowable processing time at each gateway, it is desirable to specify the required time at each gateway on any one of the transmitter terminal 241, the gateway 242, and receiver terminal 243.

Embodiment 7

Figures 35, 36:
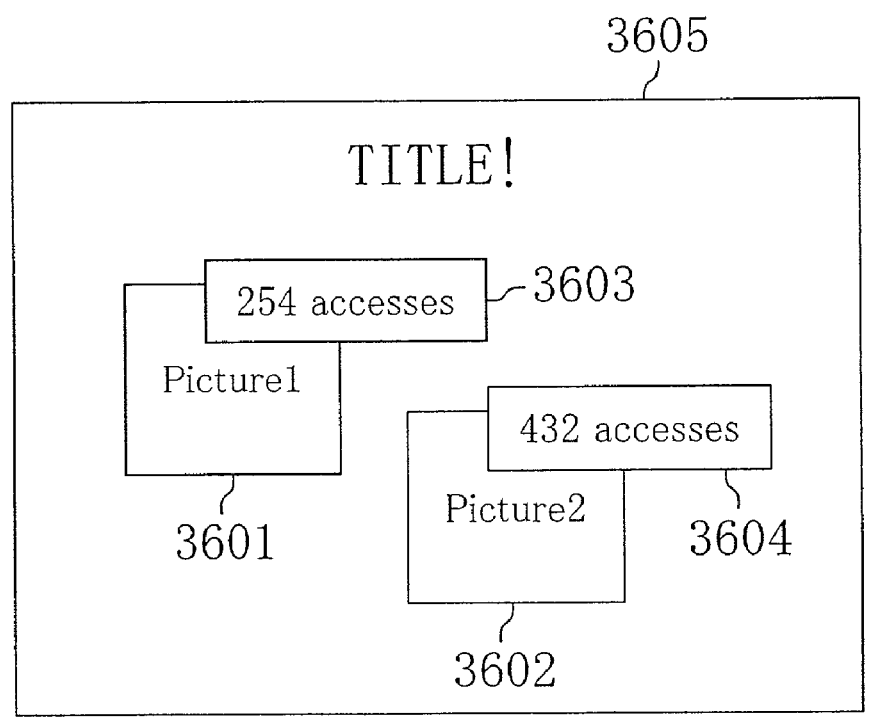
FIG. 35 is a view illustrating an example of a description of supplementary information according to a seventh embodiment of the present invention.
FIG. 36 is a view illustrating an example of displaying supplementary information.

Now, an information transmission method according to a seventh embodiment of the present invention will be explained below. Compared with the transmission contents that the gateway 242 receives from the transmitter terminal 241 and then immediately transmits to the receiver terminal 243, the accumulated contents that the gateway 242 accumulates and then transmits to the receiver terminal 243 are advantageous in that the contents can be processed or attached with statistical data. Accordingly, statistical data can be transmitted to the receiver terminal 243 as supplementary information at the gateway 242 to allow the statistical information to be displayed at the receiver terminal 243 in conjunction with the supplementary information, thereby making it possible to show the operation condition of the gateway 242 or the like at receiver terminals. In particular, by employing the number of service frequencies of certain contents as supplementary information, it is readily possible to show at the receiver terminal 243 the contents that are frequently used at the gateway 242. FIG. 35 shows an example in which the gateway 242 informs the receiver terminal 243 of the number of contents service frequencies of 254 using an extended header "Access:" of HTTP in response to a request for the contents from the receiver terminal 243. FIG. 36 shows an example of contents 3605 with two images 3601, 3602 having the number of service frequencies displayed as supplementary information 3603, 3604.

Embodiment 8

Figures 37, 38:
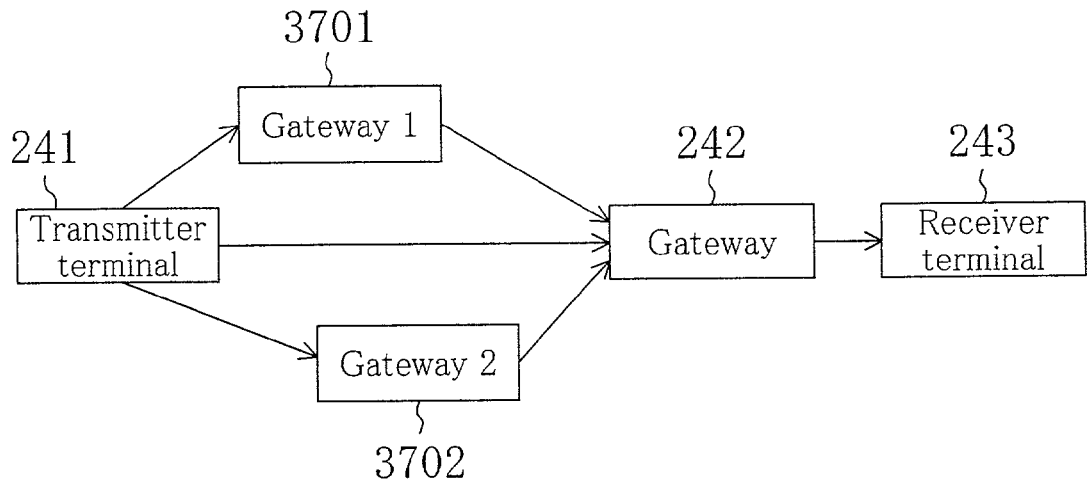
FIG. 37 is a view illustrating a network configuration according to an eighth embodiment of the present invention.
FIG. 38 is a view illustrating an example of a description for checking for the presence of contents.

Now, an information transmission method according to an eighth embodiment of the present invention will be explained below. As shown in FIG. 37, suppose the same contents as those of the transmitter terminal 241 are possibly accumulated at a gateway 1 (3701) and a gateway 2 (3702). In this case, the gateway 242 can receive the contents only from one of the three, from which the gateway 242 can receive the contents in the shortest time, and then transmits the contents to the receiver terminal 243.

It is to be understood that, to implement this, the gateway 242 manages the name, communication bandwidth, and response time of each of the gateways (3701, 3702). Terminals that act as a gateway inform adjacent network terminals of their name periodically or upon initiation of their operation. The gateway 242 receives and thus acquires their name. Communication bandwidth can be statistically calculated by recording the number of bytes of contents and the time required for the contents to be received from a corresponding gateway. Response time is determined by the measurement of time required for answering to the inquiry transmitted to a corresponding gateway. For example, as shown in FIG. 38, sending the HEAD method of HTTP makes it possible to inquire whether corresponding contents are available and the answering time can be thus checked. Accordingly, the communication bandwidth and response time tell how long it takes to effect a transmission and at what response speed the corresponding gateway will respond. Thus, use can be made of the communication bandwidth and response time as a guideline for selecting advantageous gateway for a transmission.

It can be checked whether each gateway has the corresponding contents accumulated therein, using the HEAD method mentioned above or in accordance with a contents management table exchanged periodically in advance with each other. It is to be understood that the contents management table contains the name of the contents accumulated in the gateway, their supplementary information (including their size, and the date and time of accumulation), and whether the contents have been converted as well as the name of the non-converted contents if the contents have been converted. Contents or converted contents are searched using these pieces of information, whereby it is made possible to find a path that imposes less load to the network and transmit the contents immediately over the path.

Embodiment 9

Figure 39:
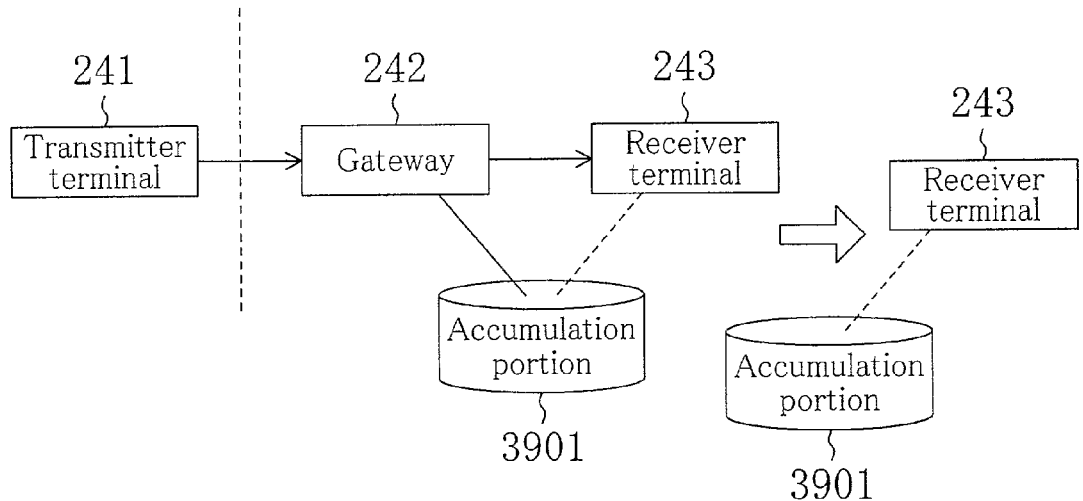
FIG. 39 is a view illustrating a network configuration according to a ninth embodiment of the present invention.

Now, an information transmission method according to a ninth embodiment of the present invention will be explained below. Referring to FIG. 39, suppose that the gateway 242 and the receiver terminal 243 are physically located close to each other, and an accumulation portion 3901 for accumulating contents is removed from the gateway 242 so that the receiver terminal 243 can reference the accumulation portion 3901. In this case, even when the receiver terminal 243 and the gateway 242 cannot be connected with each other over the network, the accumulation portion 3901 can be physically transferred to allow the receiver terminal 243 to reference the accumulated contents.

For this purpose, the accumulation portion 3901 accumulates a contents management table similar to that of the eighth embodiment and the actual body of corresponding contents. Since the contents management table contains the supplementary information and conversion condition of contents, the contents that have been referenced so far can be referenced under the same condition, thereby making it possible to record number of service frequencies as a supplementary condition.

Embodiment 10

Figure 40:
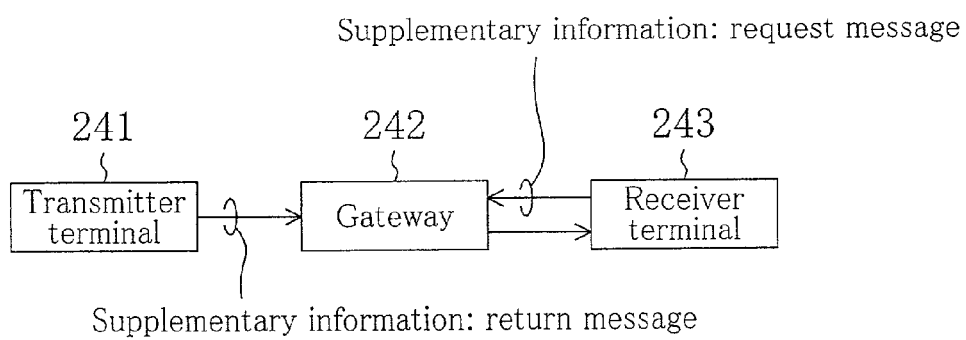
FIG. 40 is a view illustrating a system configuration according to a tenth embodiment of the present invention.

Now, an information transmission method according to a tenth embodiment of the present invention will be explained below with reference to FIG. 40. The supplementary information attached to contents such as time constraints, which has been employed in the aforementioned embodiments, can be provided by any of the transmitter terminal 241, the gateway 242, or the receiver terminal 243. Suppose the gateway 242 transmits contents using the HTTP protocol. In this case, the gateway 242 receives the supplementary information which is contained, in the form of an extended header, in a request message for contents from the receiver terminal 243 (for example, see FIGS. 26 and 28) and a return message of contents from the transmitter terminal 241 (for example, see FIG. 35). This allows the gateway 242 to attach, to the contents to be transmitted to the receiver terminal 243, any one of the supplementary information received from each of the transmitter terminal 241 and receiver terminal 243, and the supplementary information issued from the gateway 242 by itself.

The attachment of supplementary information to contents by the transmitter terminal 241 makes it possible to transmit to the receiver terminal 243 a request of the transmitter terminal 241 such as for information on a level of importance that the transmitter terminal 241 regards suitable for the contents. On the other hand, the attachment of supplementary information to contents by the receiver terminal 243 makes it possible to transmit to the gateway 242 a request of receiver terminal 243 such as for information on the length of time during which the receiver terminal 243 wants to acquire the contents and the order of the acquirement. Furthermore, the gateway 242 can transmit transmission load information and contents conversion management information of the gateway 242 such as the information on the number of service frequencies and bandwidth of the contents, and the condition employed for conversion at the gateway 242.

Embodiment 11

Now, an information transmission method according to an eleventh embodiment of the present invention will be explained below. In the foregoing embodiments, HTTP has been used for the request for and the transmission of contents. HTTP makes it possible to send supplementary information concurrently with a request for or the transmission of contents using an extended header.

Figure 41:
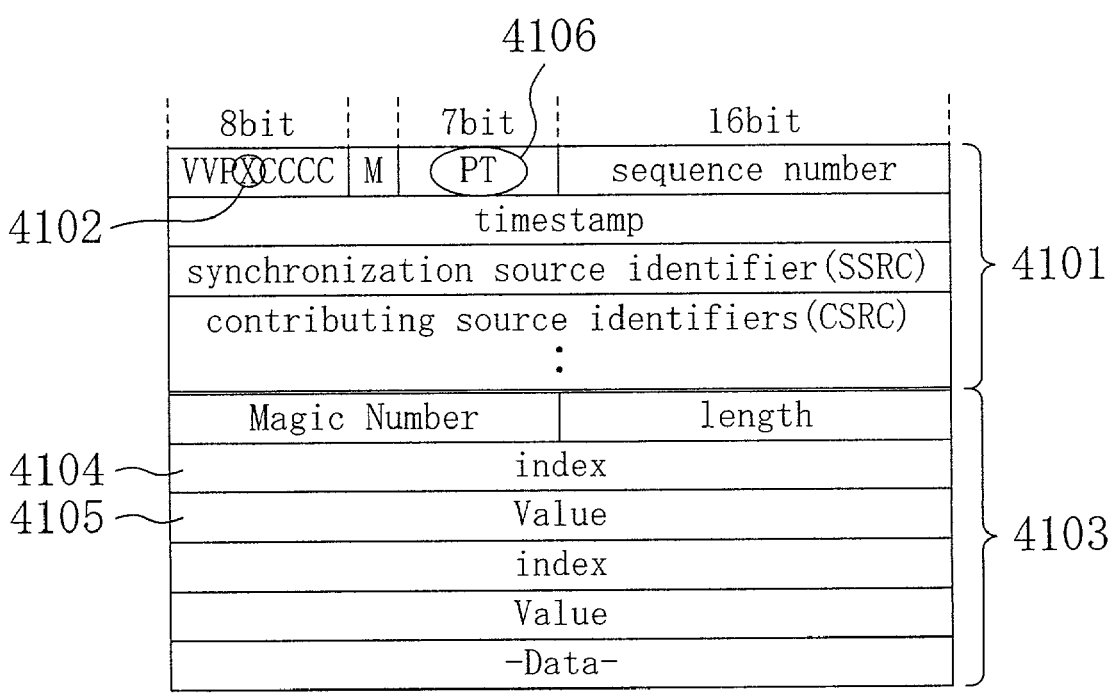
FIG. 41 is a view illustrating a data format according to an eleventh embodiment of the present invention.
Figures 42, 43:
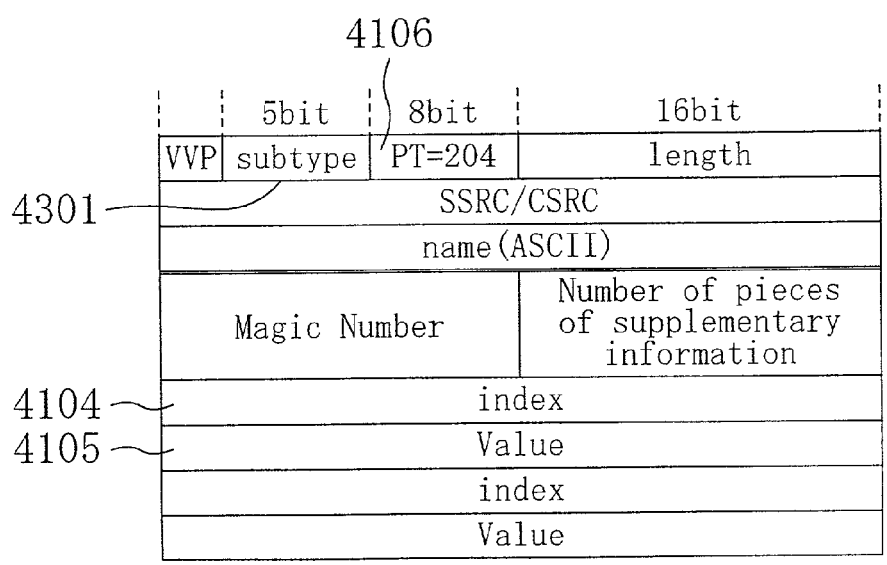
FIG. 42 is a view illustrating the data format according to the eleventh embodiment.
FIG. 43 is a view illustrating the data format according to the eleventh embodiment.

Suppose contents are transmitted using RTP protocol (H. Schulzrinne et al., "RTP: A Transport Protocol for Real-Time Applications", RFC 1889, Internet Engineering Taskforce, January 1996) to transmit stream data such as moving pictures or audio. In this case, a fixed header (4101) shown in FIG. 41 is attached to the data. Changing X (4102) of the fourth bit from the beginning of the header will make it possible to use an extended header (4103) below the double line of the figure. By defining "index" (4104) and "Value" (4105) as shown in FIG. 42, contents and supplementary information can be transmitted at the same time. Alternatively, X (4102) can be made 0 (zero) to specially define a payload type PT (4105) indicative of type of data. The data format of the remaining portion (4103) of the fixed header (4101) can thereby be made the same as that of FIGS. 41 and 42 to transmit supplementary information.

RTCP ("RTP Control Protocol" included in the aforementioned RFC1889) is used for the receiver terminal 243 to transmit supplementary information involving no data but including a request for a change in bandwidth or time constraint. As shown in FIG. 43, RTCP makes it possible to define a description for each application by designating the payload type (4106) as 204. It is made possible to transmit supplementary information involving no data by providing "subtype" (4301) with an appropriate value (e.g., 24) and by defining "index" (4104) and "Value" (4105) as shown in FIG. 42.

Embodiment 12

Now, an information transmission method according to a twelfth embodiment of the present invention will be explained below. FIG. 44 shows the configuration of a network according to the present invention. The object "information" of the present invention can be used in any form of communication information (such as for telephone, FAX, e-mail, and message board) 424, broadcast contents (such as for TV broadcast, radio, and Internet broadcast) 443, and network contents (such as for WWW and directory service) 444.

FIGS. 45A and 45B are explanatory views illustrating the form of an information transmission. There are two forms in information transmission. As shown in FIG. 45A, one form is a method for transmitting an actual information body directly from an information transmitter terminal to a receiver terminal. At the receiver terminal, the actual information body is stored in a database 441 as necessary. As shown in FIG. 45B, the second method allows the transmitter terminal not to send the actual information body but to transmit to the receiver terminal a file describing the location of and a condition for acquiring the information. The receiver terminal acquires the actual information body in accordance with the description of the file received. Incidentally, in the case of FIG. 45B, the receiver terminal does not always need the database.

FIG. 46 is an explanatory view illustrating a method for describing the location of and conditions for acquiring information. The description of an information storage source are provided with information that can identify the location of information such as telephone numbers, addresses, latitudes, longitudes, http addresses, ftp (file transmission protocol) addresses, and mail addresses. In addition, the conditions for acquiring information from the information storage source contain, for example, a time period, time limit, bandwidth, compression method, file size, storage capacity, terminal load, cost, time required for a transmission, version information, priority to be presented, IP (Internet Protocol) address, port number, host name, typical image, and sensor information. As an implementation method, a protocol such as ftp, http, mail, or a special protocol may be used to inform an information receiver terminal of a condition for acquiring information. The same protocol may also be used for a receiver terminal to acquire an actual information body.

Referring to FIG. 46, a description method 1 is an example in which the location of information is described using the ftp protocol. On the other hand, a description method 2 is an example in which the location of information is described using a telephone number, an address, a latitude, and a longitude. A description method 3 is an example in which described are a time period during which information can be acquired (e.g., an acquirement is allowed during a time period from AM0:00 to AM8:00) and a time limit (e.g., a corresponding file is acquired within one hour). Description methods 4, 5, and 6 are examples in which described are bandwidth, a storage capacity, and a terminal load, respectively. In method 4, for example, a corresponding file is acquired if bandwidth of 64 kbps or more is available but the file is not acquired if the bandwidth is not available. In method 5, a corresponding file is acquired if a storage capacity of 3 MB or more is available to a receiver terminal. Here, the file has a size of 1 MB or less and a compression method of JPEG is employed. In method 6, a corresponding file is acquired if the load of the transmitter terminal is below 50%. The terminal load and bandwidth available may be estimated according to the response time, delay time, jitter, or packet loss. A plurality of locations and acquirement conditions of these pieces of information may exist. Costs may also be described. In accordance with the compression method or transmission bandwidth, it is also allowed to describe the estimated time required for a reception, the version information, the priority the sender wants to present, the IP address, the port number, the host name, the typical image, and the sensor information (description methods 7 to 11). In accordance with these pieces of information, the information to be acquired is selected, a proper compression is effected at the transmitter terminal, a transmission bandwidth is reserved at the transmitter terminal or receiver terminal.

Figure 47:
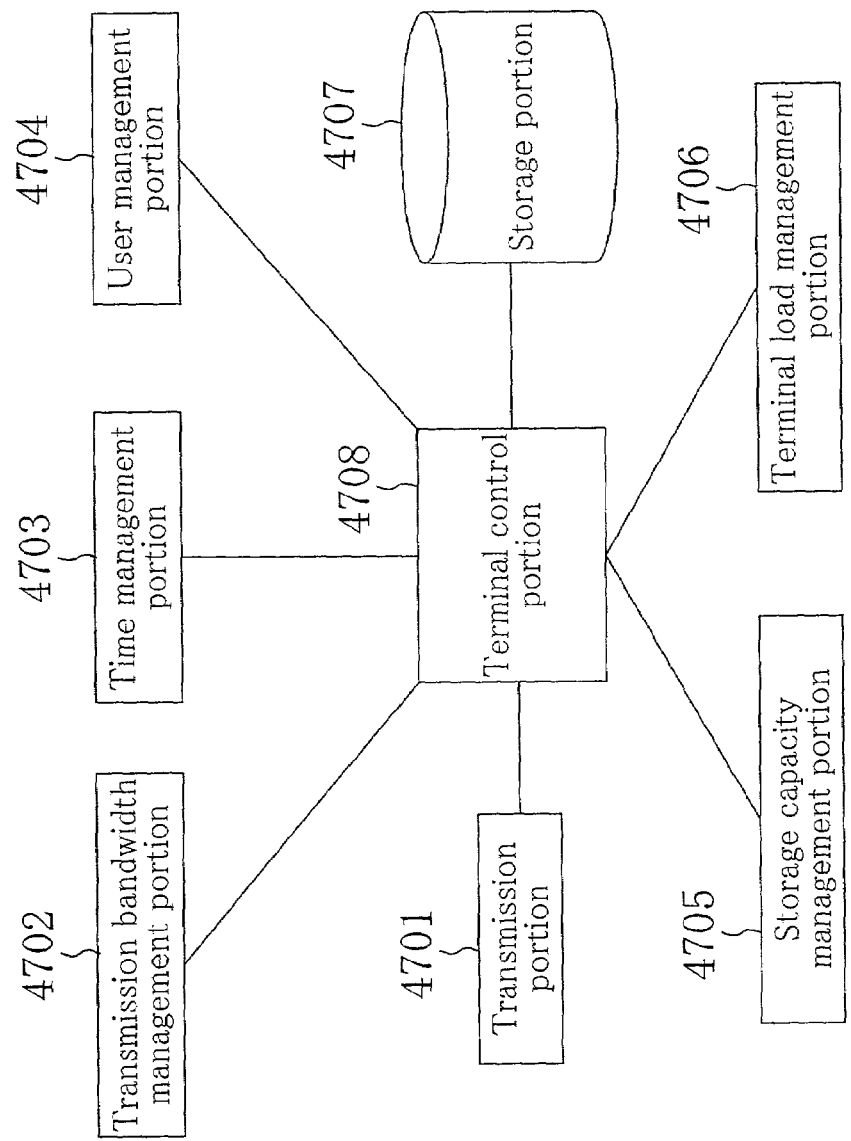
FIG. 47 is an explanatory view illustrating the configuration of a transmitter and receiver terminal.

FIG. 47 is an explanatory view illustrating the configuration of a transmitter and receiver terminal. The transmitter and receiver terminals comprise a transmission portion 4701 for transmitting and receiving information, a transmission bandwidth management portion 4702 for managing information on transmission bandwidth available, a time management portion 4703 for managing time information, and a user management portion 4704 for managing user information (such as the user name, the information on the storage capacity available to the user, and the billing information for information) and the user location (e.g., the name of a machine). The transmitter and receiver terminals also comprise a storage capacity management portion 4705 for managing the storage capacity of the terminals, a terminal load management portion 4706 for managing the load of the terminals, a storage portion 4707 for storing information in the terminals, and a terminal control portion 4708 for controlling these portions. Both the transmitter terminal and the receiver terminal do not need to be provided with all functions (e.g., the storage portion is not always required). In addition, the transmitter terminal may inform the receiver terminal that the transmitter terminal itself has information or may instead inform the receiver terminal of the location of a terminal that is provided with the information.

Furthermore, the information transmitter terminal may transmit information itself or only a description of the storage source of information and a description of the condition for acquiring information from storage source of information in accordance with one or more conditions of a time period, time limit (e.g., the time for discarding information), bandwidth, compression method, file size, storage capacity, terminal load, cost, time required for a transmission, version information, priority to be presented, IP address, port number, host name, typical image, and sensor information. Similarly, the information receiver terminal may select the information that should be acquired from the storage source of information in accordance with one or more conditions of a time period, time limit, bandwidth, compression method, file size, storage capacity, terminal load, cost, time required for a transmission, version information, priority to be presented, IP address, port number, host name, IP address, port number, host name, typical image, and sensor information. The condition for acquiring these pieces of information can also be used not only between the transmitter and receiver terminals but also for the reservation of network resources such as a gateway, a router, and cache, through which information passes.

The present invention allows information to be accumulated and managed in the form of the combination of the storage source of the information and the condition for acquiring the information or the information itself. This obviates the need for making all the information available in the same storage device. Therefore, information can be centralized without preparing a large-scale storage capacity. This facilitates application of the present invention to a low-performance device representative of a household electrical appliance or a low-performance network. On the other hand, since the actual information body is not centralized, the load of the storage device (processing and maintenance) can be distributed. In other words, it is not necessary to transmit the actual information body to the source of requested information but only inform the source of the location of the actual information body and the condition for acquiring the information. The source of requested information acquires the actual information body in accordance with the location of the actual information body and the condition for acquiring the information, which have been provided. Furthermore, even when the actual information body cannot be transmitted due to the shortage of transmission bandwidth or storage capacity, only the storage source of the information and the condition for acquiring the information can be transmitted, thereby facilitating the management of updating the information. It is not necessary for the one who acquires information to acquire the actual information body but only necessary to reference the condition for acquiring information (e.g., a typical image). In addition, for example, use of sensor information makes it possible to automatically inform the user of the update of information. In a case where a problem of communication cost may arise, it is also possible to schedule the actual information body to be acquired at a low communication cost during midnight. The present invention can be thus applied to the cases where transmission bandwidth or terminal performance vary.

Figure 48:
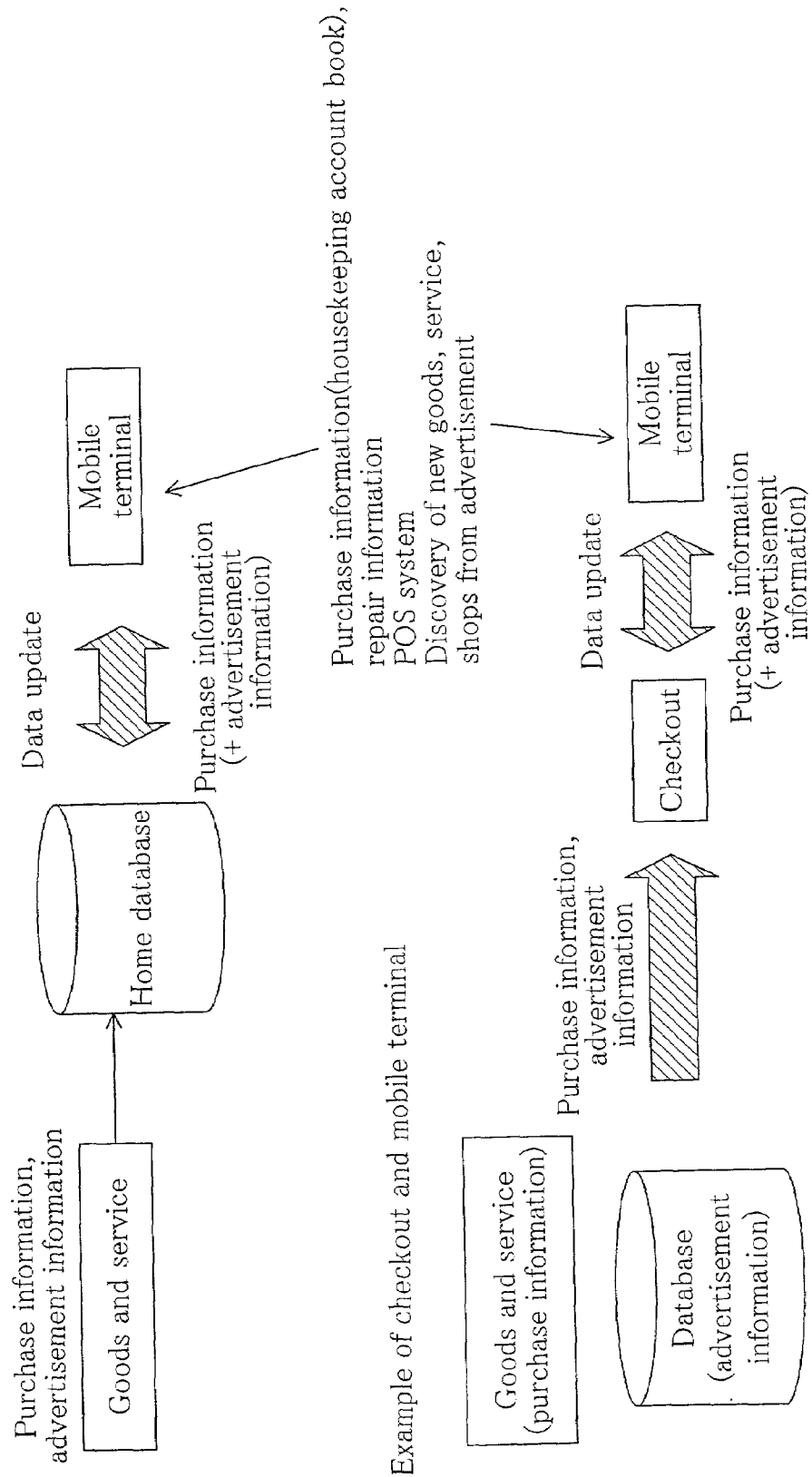
FIG. 48 is an explanatory view illustrating a method for using a mobile terminal.

FIG. 48 show explanatory views illustrating methods for using a mobile terminal. In a first example, a home server manages purchase information and advertisement information. In this example, it is to be understood that the user purchases goods using on-line shopping, and in accordance with an actual record of goods purchased at a shop, the information on the purchased goods or service or advertisement information is sent to and stored in the home server. Suppose the home server is a first terminal and the mobile telephone is a second terminal. Suppose also the second terminal is provided with means for storing information. The information that is managed by the first and second terminals is checked and the information of the second terminal is updated. Upon update of information, updated are at least one or more pieces of an actual information body, the description of a storage source of information, and the condition for acquiring information from the storage source of information. The update is carried out in accordance with the user name, date and time, the type of information (purchase information and advertisement information). The second example describes the connection between a checkout of the shop and a mobile terminal. The user compares the purchase information to be inputted into a POS (Point of Sales) system employed in the shop with the information managed by the user's mobile terminal to update the information in the same way as in the first example. (Here, suppose the POS system of the shop is a first terminal and the mobile terminal of the user is a second terminal.)

In addition, upon update of the information of the second terminal, the advertisement information is transferred or updated and thereby a bonus is given to the user of the second terminal (e.g., a discount on communication cost and the terminal fee or an issue of a coupon). Incidentally, the purchase information may contain at least one or more pieces of information of the purchaser's name, goods' name, service name, quantity, shelf life, expiry date, and date of repair (it may contain information regarding goods such as ingredients or materials used, country of origin, and (the level of) popularity). Furthermore, the advertisement information comprises at least one or more pieces of information of the advertiser, the shop, goods' name, service name, information on entertainment, and expiry date of advertisement. Any one of wireless means, wired means, or a storage medium may be employed for communication between the mobile terminal and the first terminal. The mobile terminal may be any one of a personal computer, a mobile telephone, or an IC card. The update and management of purchase and advertisement information by the mobile terminal allow the user to easily maintain the purchase record of goods or service (house-keeping account book), record of repair of devices, stock management of food or consumables as well as to find easily new goods, service, or shops in the advertisement. Furthermore, the purchase and advertisement information may be managed not by the shop but by an independent organization or company. The independent organization or company can make a profit by advertisement information or by collecting pieces of purchase information from a plurality of shops to summarize purchase trends and feed back the trends to the shops. It is also possible that a shop does not provide an independent organization with the purchase information of the user but the user himself or herself provides the independent organization with the purchase information to receive a bonus (such as a discount on communication cost or terminal fee or the issue of a coupon) in exchange thereof. The independent organization can make a profit from the advertisement fee paid by shops or from the provision of information such as on purchase trends of consumers. The first and second terminals may comprise the transmitter and receiver terminals described in FIG. 47.

Figure 49:
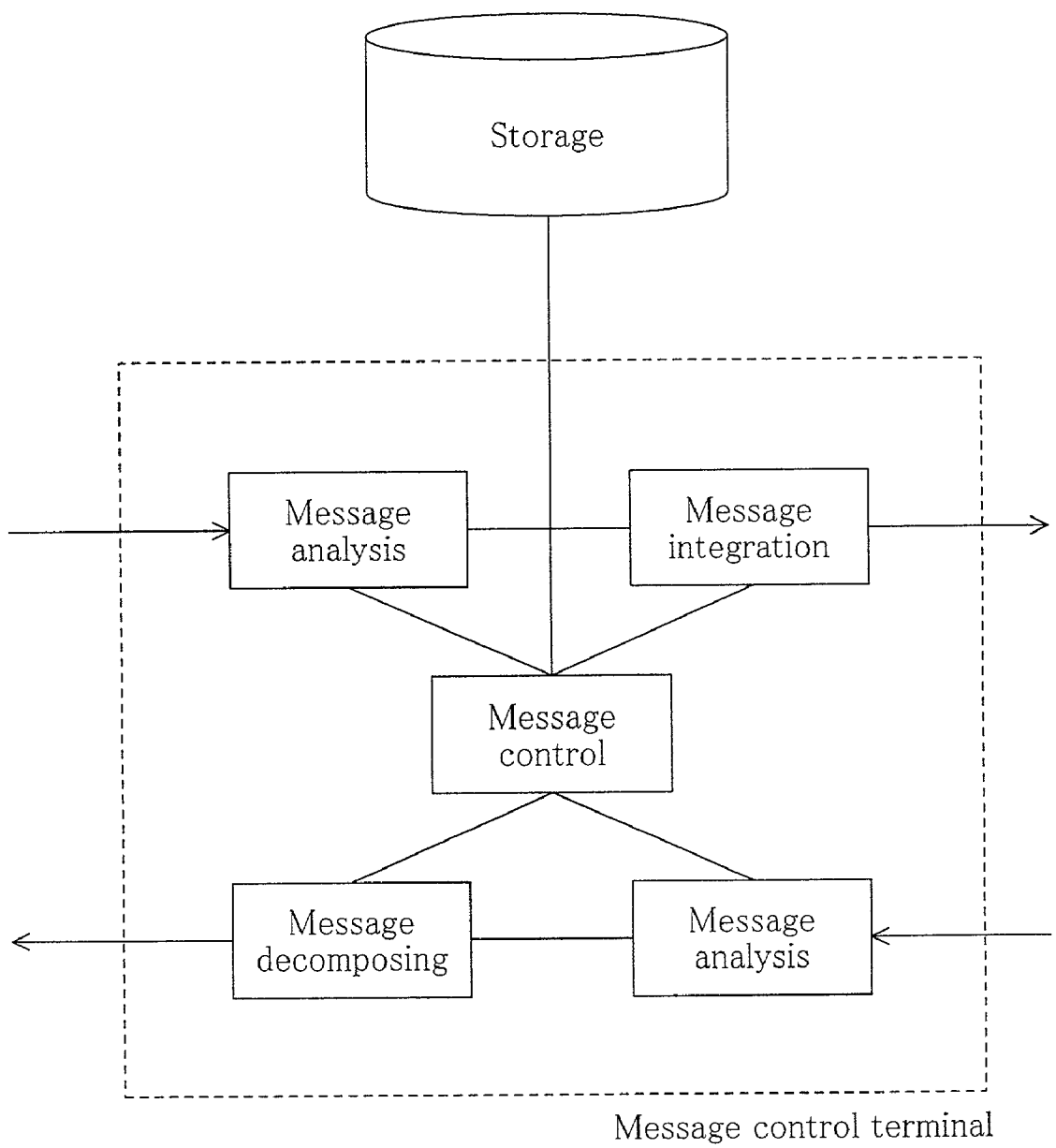
FIG. 49 is an explanatory view illustrating a message control terminal for composing and decomposing messages.

FIG. 49 is an explanatory view illustrating a message control terminal for composing and decomposing messages. The arrangement of FIG. 49 comprises a message analysis portion for receiving information and analyzing the destination and the description of the information, and a message composing portion for performing one of the accumulation, conversion, and composition of the information in accordance with the analysis of the information and then transmitting the resulting information. The arrangement converts the information into at least one or more forms of an actual information body, a description of storage source of information, and a condition for acquiring information from the storage source of information in accordance with the analysis of the information, and then stores or transmits the resulting converted information. On the other hand, the arrangement also comprises a message analysis portion for receiving information and analyzing the destination and the description of the information, and a message decomposing portion for acquiring the information from a storage portion for conversion, decomposition, and transmission of the information in accordance with the analysis of the information. The arrangement converts the information into at least one or more forms of an actual information body, a description of storage source of information, and a condition for acquiring information from the storage source of information in accordance with the analysis of the information, and then transmits the resulting converted information. Incidentally, both the functions for composing and decomposing a message may be or may not be provided to the same message control terminal. If both the functions are available, the message control portion may centralize and manage the functions as shown in FIG. 49.

FIG. 50 is an explanatory view illustrating an example of using the message control terminal for composing and decomposing messages. FIG. 50 shows an example of a message control terminal applied to an ITS (Intelligent Transport System). The ITS can acquire successively sensor information or AV information (audio and video) from roads and vehicles in accordance with places (location information). Here, the sensor information denotes GPS (Global Positioning System) information or the like. In a large-scale network, it is difficult to centralize and manage sensor information or AV information, which are acquired at various places, from the viewpoints of network resources and storage capacity. As shown in FIG. 50, a hierarchical arrangement of message control terminals described in FIG. 49 facilitates information management. That is, end networks close to vehicles and roads can acquire many pieces of sensor information or AV information. For this reason, a plurality of pieces of sensor information or AV information are divided by location or a time period (integrated into one message). The resulting messages are stored in the storage device of an end message control terminal, then the location of the storage source and the summarized sensor information are transmitted to a center station. Thus, the amount of information to be transmitted to the center station is reduced. A user who wants to reference the summarized sensor and AV information can acquire the location of the AV information storage source and the sensor information from the center station, and the actual information body from the storage source of the AV information.

On the contrary, suppose the AV information or the sensor information that has been collected at the center station is delivered to users. In this case, the center station delivers the sensor information and the location of the related AV information, while the actual body of the AV information is acquired from the AV information storage device of an end message control terminal. The acquired actual body is delivered to the user in conjunction with the sensor information.

This system may also be operated in such a way that advertisement information is collected from end users at each area, combined, and delivered to other users. The advertisement information may be delivered from the center station. System operators can make a profit from an information provision fee (sensor information and AV information) or an advertisement fee. The present invention facilitates large-scale collection and transmission of information.

Incidentally, the message control terminal may comprise the transmitter and receiver terminals described in FIG. 47. That is, information may be transmitted or accumulated in any form of expression of an actual information body, a description of storage source of information, and a condition for acquiring information from the storage source of information in accordance with the remaining amount of transmission bandwidth or storage capacity.

In any case of FIGS. 48 to 50, information can be updated in accordance with time, a location (GPS), a mobile telephone within a dead space or not, the instruction of a user, or the storage capacity and transmission bandwidth of the information.

For example, the present invention can be applied to the WWW cache and information search service on the Internet or to the accumulation-type communication device of a telephone (including a phone-answering type) and FAX. However, the transmission path is not limited to the Internet protocol. Without preparing a large-capacity storage device, the present invention makes it possible to manage information and contents in one storage device and acquire necessary information in an easy manner. Here, the information and contents include communication information (such as of a telephone, FAX, e-mail, or a message board), broadcast contents (such as of a TV broadcast, a radio broadcast, or an Internet broadcast), and network contents (such as of WWW or directory service).

Embodiment 13

Now, an information transmission method according to a thirteenth embodiment of the present invention will be explained below with reference to FIG. 51. The system of FIG. 51 comprises a service provision terminal provided with a storage device, and a user terminal which can accommodate one or more apparatuses such as a personal computer (PC), FAX, (mobile) telephone (and which is connected to a network). The system is adapted to compare information held by each apparatus with information stored in the storage device of the service provision terminal in accordance with a specified rule to update the information stored in the storage device of the service provision terminal (FIG. 51(1)). The information stored in a storage device provided to an apparatus can be transmitted to the service provision terminal and updated, whereby the information of the apparatus can be referenced or modified even when the apparatus is turned off. Suppose the information of the service provision terminal has been updated. Even in this case, when the apparatus at home is turned on to be available for service, the apparatus will check updates of the information of the service provision terminal and then update the information of the apparatus itself, thereby making it possible to keep consistency of the information.

Incidentally, when a storage device is available at the user terminal, the apparatus or the service provision terminal may update information via the storage device of the user terminal. Predetermined information (e.g., a document file of a specific directory) is updated only when at least one or more operations have been performed. That is, the update is carried out at the time of termination of an apparatus, at predetermined intervals, at the time of reading or recording information on the storage device, or at the time of having performed a predetermined operation (e.g., in the absence of I/O operation during a given period of time). Here, for example, what is meant by the information includes a document file for the personal computer, an electronic image file (or a file attached to e-mail) for the FAX, and electronically recorded audio for the telephone.

Alternatively, the system comprises a service provision terminal provided with a storage device, and a user terminal which can accommodate one or more apparatuses and which is provided with a storage device. The system is adapted to compare information held by the user terminal with information stored in the storage device of the service provision terminal in accordance with a specified rule to update the information stored in the storage device of the service provision terminal (FIG. 51(2)). Suppose various pieces of information are collected and recorded at the user terminal. In this case, the information is transmitted to and updated at the service provision terminal to allow easy access to the information inside home from outside home. Like the foregoing system, even when the information of the service provision terminal has been updated, the information of the user terminal is updated automatically, thereby making it possible to keep consistency of the information. This service form can be applied to a case where all pieces of home information are centralized at the storage device of the user terminal.

In a still another form of service, the system comprises a service provision terminal provided with a storage device, and a user terminal which can accommodate one or more apparatuses and which is provided with a storage device. The system is adapted to compare information held by each apparatus with information stored in the storage device of the user terminal in accordance with a specified rule to update the information stored in the storage device of the user terminal. The information stored in a storage device provided to an apparatus can be transmitted to the terminal and updated, whereby access is available to the information of the apparatus even when the apparatus is turned off (FIG. 51(3)). Suppose the information of the user terminal has been updated. Even in this case, when the apparatus at home is turned on to be available for service, the apparatus will check updates of the information of the user terminal and then update the information of the apparatus itself, thereby making it possible to keep consistency of the information. In this service form, it is not necessary to prepare a service provision terminal (a storage device) that is provided by a provider.

As described above, according to the arrangement of FIG. 51, the information of an apparatus can be readily referenced or updated even when the apparatus at home is turned off or access thereto is restricted. A protocol for updating information may be a standard protocol such as ftp or a special protocol. Incidentally, this system can be applied not only to home use but also to mobile communications typically for vehicle use.

INDUSTRIAL APPLICABILITY

According to the present invention, it is possible to implement a gateway which allows for efficient use of transmission bandwidth and storage media irrespective of a transmission gap between a transmitter and receiver side. The gateway can be applied not only to a home gateway but also to a gateway to be used in a vehicle and to a mirror server. The present invention makes it possible to employ as a transmission path not only a communication line such as a telephone, ATM, wireless LAN, or Bluetooth line but also a broadcast medium such as CATV or a satellite broadcast. This technology is effective even when stream video and document information are referenced simultaneously such as in a television broadcast with an information link like the BS digital broadcast.

What is claimed is:

1. An information transmission method comprising the steps of:
    monitoring transmission bandwidth for transmitting data to and receiving data from a transmitter terminal,
    determining a procedure of requesting for data with a request for transmission being employed as input,
    controlling a service method of a cache in accordance with information on bandwidth of said transmitter terminal and said request for data,
    monitoring transmission bandwidth for transmitting data to and receiving data from a receiver terminal,
    allowing a user to input said request for transmission at said receiver terminal,
    controlling a service method of said cache in accordance with information on bandwidth of said receiver terminal, and
    allowing program information and contents management information containing a description of a location of program-related information to be inputted, acquiring and accumulating the program-related information automatically in advance by a receiver side before or in response to progress of a program, and presenting the information acquired in advance by the receiver side in response to a program rating.

2. An information transmission method comprising the steps of:
    monitoring transmission bandwidth for transmitting data to and receiving data from a transmitter terminal,
    determining a procedure of requesting for data with a request for transmission being employed as input,
    controlling a service method of a cache in accordance with information on bandwidth of said transmitter terminal and said request for data,
    monitoring transmission bandwidth for transmitting data to and receiving data from a receiver terminal,
    allowing a user to input said request for transmission at said receiver terminal,
    controlling a service method of said cache in accordance with information on bandwidth of said receiver terminal, and
    allowing contents having a time constraint and communication rate as supplementary information to be inputted, transmitting accumulated converted contents having the same description as that of said contents and having the same supplementary information as said supplementary information, converting a size of said inputted contents in accordance with said supplementary information if corresponding accumulated converted contents are not available, and accumulating and transmitting converted contents in conjunction with supplementary information containing both a name and a size of non-converted contents to thereby transmit contents at the specified communication rate within a specified length of time while conversion time is being saved.

3. An information transmission method comprising the steps of:
    monitoring transmission bandwidth for transmitting data to and receiving data from a transmitter terminal,
    determining a procedure of requesting for data with a request for transmission being employed as input, controlling a service method of a cache in accordance with information on bandwidth of said transmitter terminal and said request for data, monitoring transmission bandwidth for transmitting data to and receiving data from a receiver terminal, allowing a user to input said request for transmission at said receiver terminal, controlling a service method of said cache in accordance with information on bandwidth of said receiver terminal, and upon transmission of accumulated contents, allowing said contents to be attached with supplementary information corresponding to a condition of said accumulated contents and transmitted, said contents with said supplementary information to be received, and said supplementary information to be displayed by said receiver terminal.

4. An information transmission method comprising the steps of:

monitoring transmission bandwidth for transmitting data to and receiving data from a transmitter terminal, determining a procedure of requesting for data with a request for transmission being employed as input, controlling a service method of a cache in accordance with information on bandwidth of said transmitter terminal and said request for data, monitoring transmission bandwidth for transmitting data to and receiving data from a receiver terminal, allowing a user to input said request for transmission at said receiver terminal, controlling a service method of said cache in accordance with information on bandwidth of said receiver terminal, and in accordance with a result of analysis of information, allowing the information to be converted into and transmitted in at least one or more forms of an actual information body, a description of storage source of the information, and a condition for acquiring the information from the storage source of the information.

5. An information transmission system comprising a transmitter terminal communication interface for transmitting data to and receiving data from at least one transmitter terminal, a transmitter terminal bandwidth monitor portion for monitoring a transmission bandwidth for transmitting data to and receiving data from said transmitter terminal, a storage portion for accumulating data, a request management portion for allowing a request for a transmission to be inputted and determining a procedure of the request to be outputted, a data management portion for controlling a method for using said storage portion in accordance with bandwidth information of the transmitter terminal monitored by said transmitter terminal bandwidth monitor portion and the request from said request management portion, and a data interpretation portion for interpreting a description of data acquired by said data management portion, extracting a data address considered being requested subsequently, and determining an order of the request in accordance with a transmission condition to request said request management portion for data.

6. An information transmission system comprising a transmitter terminal communication interface for transmitting data to and receiving data from at least one transmitter terminal, a transmitter terminal bandwidth monitor portion for monitoring a transmission bandwidth for transmitting data to and receiving data from said transmitter terminal, a storage portion for accumulating data, a request management portion for allowing a request for a transmission to be inputted and determining a procedure of the request to be outputted, a data management portion for controlling a method for using said storage portion in accordance with bandwidth information of the transmitter terminal monitored by said transmitter terminal bandwidth monitor portion and the request from said request management portion, wherein the database management portion having at least one or more of recording time management means for managing a recording time of the acquired information, reference time management means for managing a reference time of the acquired information, search key management means for managing a search key provided for the acquired information, and copy status management means for managing a copy status of the acquired information.

7. An information transmission system comprising a transmitter terminal communication interface for transmitting data to and receiving data from at least one transmitter terminal, a transmitter terminal bandwidth monitor portion for monitoring a transmission bandwidth for transmitting data to and receiving data from said transmitter terminal, a storage portion for accumulating data, a request management portion for allowing a request for a transmission to be inputted and determining a procedure of the request to be outputted, a data management portion for controlling a method for using said storage portion in accordance with bandwidth information of the transmitter terminal monitored by said transmitter terminal bandwidth monitor portion and the request from said request management portion, and a transfer control portion for acquiring requested data from said data management portion in response to a request from said request management portion, and processing the data acquired from said data management portion as necessary in accordance with a transmission condition from said request management portion or said data management portion.

8. The information transmission system according to claim 7, further comprising a capacity monitor portion for monitoring a storage capacity of said storage portion, wherein said data management portion selects at least one of storing in said storage portion, transferring to said transfer control portion, and discarding data inputted at said transmitter terminal communication interface or data specified by said transfer control portion and acquired from said storage portion, in accordance with at least one of a transmission condition from said transmitter terminal inputted at said transmitter terminal communication interface, bandwidth information of said transmitter terminal monitored by said transmitter terminal bandwidth monitor portion, and storage capacity information of said storage portion monitored by said capacity monitor portion, as well as sends transfer control information to said transfer control portion.

9. The information transmission system according to claim 7, further comprising a transmitter terminal bandwidth control portion for managing and controlling transmission bandwidth of said transmitter terminal communication interface, and a schedule management portion for issuing a request specified by said request management portion to said transmitter terminal communication interface at time specified by or timing specified by said request management portion, said information transmission system wherein
concerning said request for a transmission, said request management portion outputs an inquiry for presence or absence of data in conjunction with a transmission condition to said transfer control portion and transmits the stored data in accordance with the transmission condition,
if the stored data does not exist, said request management portion transmits bandwidth control information to said transmitter terminal bandwidth control portion in accordance with at least one of a type of requested data, a transmission condition from said transmitter terminal acquired from said transfer control portion, a transmission condition of the system acquired from said transfer control portion, and bandwidth information of the transmitter terminal monitored by said transmitter terminal bandwidth monitor portion, and
said request management portion determines a request procedure and then allows said transmitter terminal communication interface to transmit the request to said transmitter terminal, the request to be outputted to said schedule management portion in conjunction with a request transmission schedule, or the request having already been held in said schedule management portion to be outputted.

10. An information transmission system comprising
a transmitter terminal communication interface for transmitting data to and receiving data from at least one transmitter terminal,
a transmitter terminal bandwidth monitor portion for monitoring a transmission bandwidth for transmitting data to and receiving data from said transmitter terminal,
a storage portion for accumulating data,
a request management portion for allowing a request for a transmission to be inputted and determining a procedure of the request to be outputted,
a data management portion for controlling a method for using said storage portion in accordance with bandwidth information of the transmitter terminal monitored by said transmitter terminal bandwidth monitor portion and the request from said request management portion,
a receiver terminal communication interface for transmitting data to and receiving data from at least one receiver terminal,
a receiver terminal bandwidth monitor portion for monitoring transmission bandwidth for transmitting data to and receiving data from said receiver terminal,
means for inputting said request for a transmission at said receiver terminal,
said information transmission system wherein
said data management portion has further a function for controlling a method for using said storage portion in accordance with the bandwidth information of the receiver terminal monitored by said receiver terminal bandwidth monitor portion, and
a transfer control portion for acquiring requested data from said data management portion in response to a request from said request management portion, and processing the data acquired from said data management portion as necessary to be transmitted from said receiver terminal communication interface to said receiver terminal in accordance with a transmission condition from said request management portion or said data management portion.

11. The information transmission system according to claim 10, further comprising
a receiver terminal bandwidth control portion for managing and controlling transmission bandwidth of said receiver terminal communication interface, and
a capacity monitor portion for monitoring a storage capacity of said storage portion, wherein
said data management portion selects at least one of storing in said storage portion, transferring to said transfer control portion, and discarding data inputted at said transmitter terminal communication interface or data specified by said transfer control portion and acquired from said storage portion, in accordance with at least one of a transmission condition from said transmitter terminal inputted at said transmitter terminal communication interface, a transmission condition from said receiver terminal inputted at said transfer control portion, bandwidth information of the receiver terminal monitored by said receiver terminal bandwidth monitor portion, bandwidth information of the transmitter terminal monitored by said transmitter terminal bandwidth monitor portion, and storage capacity information of said storage portion monitored by said capacity monitor portion, as well as sends bandwidth control information to said receiver terminal bandwidth control portion and transfer control information to said transfer control portion.

12. The information transmission system according to claim 10, further comprising
a transmitter terminal bandwidth control portion for managing and controlling transmission bandwidth of said transmitter terminal communication interface, and a schedule management portion for issuing a request specified by said request management portion to said transmitter terminal communication interface at time specified by or timing specified by said request management portion,
said information transmission system wherein
concerning a request received by said receiver terminal communication interface from said receiver terminal, said request management portion outputs an inquiry for presence or absence of data in conjunction with a transmission condition to said transfer control portion and transmits the stored data in accordance with the transmission condition,
if the stored data does not exist, said request management portion transmits bandwidth control information to said transmitter terminal bandwidth control portion in accordance with at least one of a type of requested data, a transmission condition from said transmitter terminal acquired from said transfer control portion, a transmission condition of the system acquired from said transfer control portion, and bandwidth information of the transmitter terminal monitored by said transmitter terminal bandwidth monitor portion, and said request management portion determines a request procedure and then allows said transmitter terminal communication interface to transmit the request to said transmitter terminal, the request to be outputted to said schedule management portion in conjunction with a request transmission schedule, or the request having already been held in said schedule management portion to be outputted.

* * * * *

UNITED STATES PATENT AND TRADEMARK OFFICE
CERTIFICATE OF CORRECTION

| | |
|---|---|
| PATENT NO. | : 6,965,604 B1 |
| APPLICATION NO. | : 09/869664 |
| DATED | : November 15, 2005 |
| INVENTOR(S) | : Junichi Sato et al. |

It is certified that error appears in the above-identified patent and that said Letters Patent is hereby corrected as shown below:

Title Page:

Item (54) "Method and Apparatus for Information Transmission" should be --Information Transmission Method--

Signed and Sealed this

Seventeenth Day of October, 2006

JON W. DUDAS
*Director of the United States Patent and Trademark Office*